United States Patent
Oh et al.

(10) Patent No.: US 12,120,736 B2
(45) Date of Patent: Oct. 15, 2024

(54) DEVICE AND METHOD FOR CHANNEL ACCESS IN WIRELESS COMMUNICATION SYSTEM

(71) Applicant: Samsung Electronics Co., Ltd., Suwon-si (KR)

(72) Inventors: Jinyoung Oh, Suwon-si (KR); Jeongho Yeo, Suwon-si (KR); Hyunseok Ryu, Suwon-si (KR); Sungjin Park, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 17/309,884

(22) PCT Filed: Dec. 27, 2019

(86) PCT No.: PCT/KR2019/018663
§ 371 (c)(1),
(2) Date: Jun. 25, 2021

(87) PCT Pub. No.: WO2020/139047
PCT Pub. Date: Jul. 2, 2020

(65) Prior Publication Data
US 2022/0095375 A1     Mar. 24, 2022

(30) Foreign Application Priority Data

Dec. 27, 2018  (KR) .................. 10-2018-0170792

(51) Int. Cl.
*H04W 74/0816*  (2024.01)
*H04L 1/1812*   (2023.01)
(Continued)

(52) U.S. Cl.
CPC ....... *H04W 74/0816* (2013.01); *H04L 1/1812* (2013.01); *H04L 5/0053* (2013.01);
(Continued)

(58) Field of Classification Search
CPC ........... H04W 74/0816; H04W 74/006; H04W 74/0866; H04W 72/0446; H04L 1/1812; H04L 5/0053
See application file for complete search history.

(56) References Cited

U.S. PATENT DOCUMENTS

2017/0171883 A1   6/2017  Noh et al.
2019/0297642 A1*  9/2019  Sun ................... H04L 1/1887
(Continued)

FOREIGN PATENT DOCUMENTS

CN   107438289 A   12/2017
CN   107624265 A    1/2018
(Continued)

OTHER PUBLICATIONS

International Search Report and Written Opinion of the International Searching Authority in connection with International Application No. PCT/KR2019/018663 issued Apr. 22, 2020, 11 pages.
(Continued)

*Primary Examiner* — Elton Williams

(57) ABSTRACT

The present disclosure relates to a communication method and its system for converging a 5th-Generation (5G) communication system for supporting a higher data rate than a 4th-Generation (4G) system with an Internet of things (IoT) technology. The present disclosure may be applied to intelligent services based on the 5G communication technology and an IoT-related technology (e.g., a smart home, a smart building, a smart city, a smart car or a connected car, health care, digital education, retail, security and safety services). According to various embodiments of the present disclosure,
(Continued)

an operating method of a base station, in a wireless communication system, may include performing a channel access procedure in an unlicensed band, obtaining a transmission result of a downlink signal for a reference slot based on the channel access procedure, and determining a size of a contention section for a next channel access procedure, based on the transmission result, and the reference slot may be a starting slot in downlink transmission by the base station.

17 Claims, 16 Drawing Sheets

(51) Int. Cl.
    *H04L 5/00*            (2006.01)
    *H04W 72/0446*    (2023.01)
    *H04W 74/00*       (2009.01)
    *H04W 74/08*       (2024.01)

(52) U.S. Cl.
    CPC ..... *H04W 72/0446* (2013.01); *H04W 74/006* (2013.01); *H04W 74/0866* (2013.01)

(56) References Cited

U.S. PATENT DOCUMENTS

| | | | |
|---|---|---|---|
| 2020/0236709 A1* | 7/2020 | Park | H04W 74/0816 |
| 2020/0259621 A1 | 8/2020 | Oh et al. | |

FOREIGN PATENT DOCUMENTS

| | | |
|---|---|---|
| CN | 108668377 A | 10/2018 |
| CN | 108702795 A | 10/2018 |
| EP | 3664562 A1 | 6/2020 |
| KR | 10-2019-0017608 A | 2/2019 |
| WO | 2018208211 A1 | 11/2018 |

OTHER PUBLICATIONS

Huawei, et al., "Other issues related to LBT for eLAA", 3GPP TSG RAN WG1 84 Meeting, R1-160741, St Julian's, Malta, Feb. 15-19, 2016, 5 pages.
Samsung, "Channel access procedures for NR-U", 3GPP TSG-RAN WG1 Meeting #95, R1-1812977, Spokane, USA, Nov. 12-16, 2018, 9 pages.
Nokia et al., "Proposal to progress feLAA", 3GPP TSG-RAN WG2 Meeting #101, R2-1803972,Athens, Greece, Feb. 26-Mar. 2, 2018, 5 pages.
Interdigital Inc., "HARQ Enhancements for NR-U", 3GPP TSG RAN WG1 Meeting #95, R1-1813222, Spokane, USA, Nov. 12-16, 2018, 7 pages.
European Patent Office, "Supplementary European Search Report" issued Feb. 11, 2022, in connection with European Patent Application No. 19904111.2, 10 pages.
Vivo: "Discussion on the channel access procedures", R1-1812300, 3GPP TSG RAN WG1 Meeting #95, Spokane, USA, Nov. 12-16, 2018, 7 pages.
Sony: "UL Channel access mechanism design in eLAA", R1-162555, 3GPP TSG RAN WG1 Meeting #84bis, Busan, Korea, Apr. 11-15, 2016, 4 pages.
CMCC: "Discussion on DCI format design", R1-1800546, 3GPP TSG RAN WG1 Meeting AH 1801, Vancouver, Canada, Jan. 22-26, 2018, 6 pages.
Supplementary European Search Report dated Dec. 14, 2023, in connection with European Patent Application No. 19904111.2, 9 pages.
Office Action issued Jan. 25, 2024, in connection with Chinese Patent Application No. CN201980093206, 14 pages.
Huawei et al., "Discussion on CBG-based feedback," R1-1709969, 3GPP TSG RAN WG1 NR Ad Hoc Meeting, Qingdao, China, Jun. 2017, 3 pages.
Rejection Decision issued Aug. 5, 2024, in connection with Chinese Patent Application No. 201980093206.4, 11 pages.

\* cited by examiner

DEVICE AND METHOD FOR CHANNEL ACCESS IN WIRELESS COMMUNICATION SYSTEM

CROSS-REFERENCE TO RELATED APPLICATIONS

This application is a 371 National Stage of International Application No. PCT/KR2019/018663, filed Dec. 27, 2019, which claims priority to Korean Patent Application No. 10-2018-0170792, filed Dec. 27, 2018, the disclosures of which are herein incorporated by reference in their entirety.

BACKGROUND

1. Field

The present disclosure relates to a wireless communication system, and more specifically, to an apparatus and a method for channel access in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation. Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Meanwhile, Internet is evolving from a human-centered connection network over which human generates and consumes information to an Internet of things (IoT) network over which information is exchanged and processed between distributed elements such as things. An Internet of Everything (IoE) technology in which a big data processing technology through a connection with a cloud server is combined with the IoT technology is emerging. To implement the IoT, technical elements such as sensing technology, wired/wireless communication and network infrastructure, service interface technology, and security technology are required, and technologies such as a sensor network, machine to machine (M2M), and machine type communication (MTC) for connections between things are recently researched. The IoT environment may provide an intelligent Internet technology (IT) service which creates a new value for human life by collecting and analyzing data generated from the connected things. The IoT may be applied to fields such as a smart home, a smart building, a smart city, a smart car or a connected car, a smart grid, health care, smart home appliances, and advanced medical services through convergence and composition between the existing IT and various industries.

Hence, various attempts for applying the 5G communication system to the IoT network are being made. For example, 5G communication technologies such as a sensor network, M2M, and MTC are implemented by schemes such as beamforming, MIMO, and an array antenna. The application of a cloud wireless access network (cloud RAN) as the big data processing technology as aforementioned may be said to be an example of the convergence between the 5G technology and the IoT technology.

Various services may be provided with advances of the wireless communication system. A method for smoothly providing such services is required.

SUMMARY

Based on the discussions described above, the present disclosure provides an apparatus and a method for channel access in a wireless communication system.

In addition, the present disclosure provides an apparatus and a method for performing a channel access procedure in an unlicensed band.

In addition, the present disclosure provides an apparatus and a method for contention window adjustment for performing a channel access procedure in an unlicensed band.

According to various embodiments of the present disclosure, an operating method of a base station, in a wireless communication system, may include performing a channel access procedure in an unlicensed band, obtaining a transmission result of a downlink signal for a reference slot based on the channel access procedure, and determining a size of a contention section for a next channel access procedure, based on the transmission result, and the reference slot may be a starting slot in downlink transmission by the base station.

According to various embodiments of the present disclosure, a base station in a wireless communication system may include at least one transceiver and at least one processor operatively coupled with the at least one transceiver, the at least one processor may be configured to perform a channel access procedure in an unlicensed band, obtain a transmission result of a downlink signal for a reference slot based on the channel access procedure, and determine a size of a contention section for a next channel access procedure, based on the transmission result, and the reference slot may be a starting slot in downlink transmission by the base station.

According to various embodiments of the present disclosure, an operation method of the terminal, in a wireless communication system, may include providing a base station with a transmission result of a downlink signal for a reference slot, based on a channel access procedure in an unlicensed band, and receiving a downlink signal based on a size of a contention window for a next channel access procedure, the size of the contention window for the next channel access procedure may be determined based on the transmission result, and the reference slot may be a starting slot of downlink transmission.

According to various embodiments of the present disclosure, a terminal in a wireless communication system may include at least one transceiver, and at least one processor operatively coupled with the at least one transceiver, the at least one processor may provide a base station with a transmission result of a downlink signal for a reference slot, based on a channel access procedure in an unlicensed band, and control the at least one transceiver to receive a downlink signal based on a size of a contention window for a next channel access procedure, the size of the contention window for the next channel access procedure may be determined based on the transmission result, and the reference slot may be a starting slot of downlink transmission.

An apparatus and a method according to various embodiments of the present disclosure may allow a base station and a terminal to communicate more effectively, by adjusting a contention window for a channel access procedure in an unlicensed band.

Effects obtainable from the present disclosure are not limited to the above-mentioned effects, and other effects which are not mentioned may be clearly understood by those skilled in the art of the present disclosure through the following descriptions.

DETAILED DESCRIPTION

Figure 1:
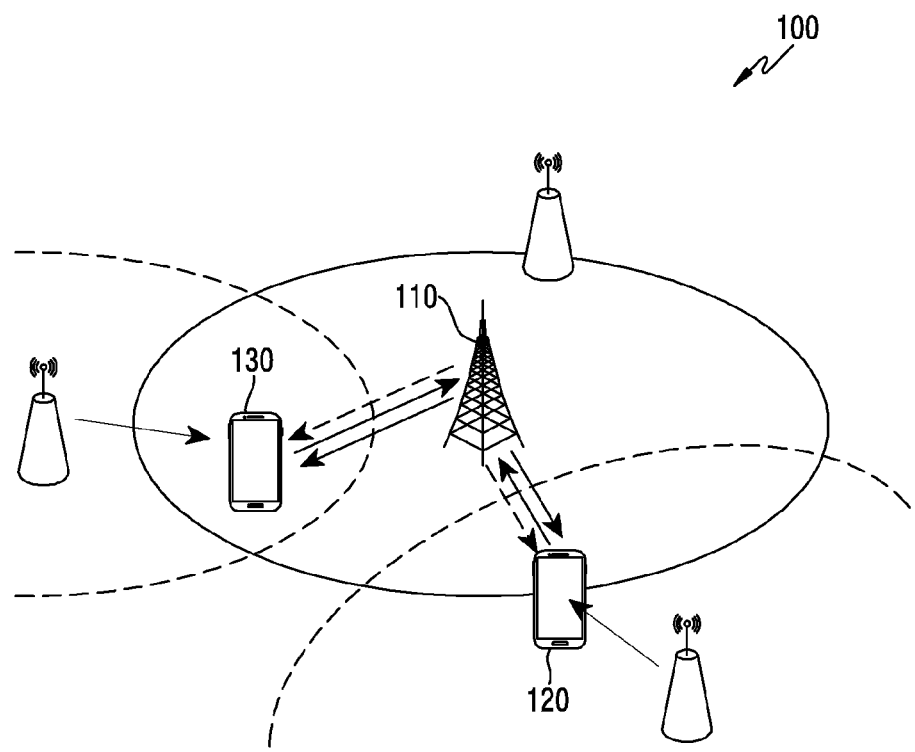
FIG. 1 illustrates a wireless communication system according to various embodiments of the present disclosure.

Hereinafter, embodiments of the present disclosure are described in detail with reference to the accompanying drawings. Also, if it is determined that a detailed description of a related known function or configuration may unnecessarily obscure the subject matter of the present disclosure in describing the present disclosure, its detailed description will be omitted. Terms to be described are terms defined by considering functions of the present disclosure, which may vary according to a user's or operator's intent or practice. Hence, their definition should be made based on contents throughout this specification.

Advantages and features of the present disclosure, and methods for achieving them will be clarified with reference to embodiments described below in detail together with the accompanying drawings. However, the present disclosure is not limited to the embodiments disclosed below but may be implemented in various different forms, the present embodiments are provided to only complete the disclosure of the present disclosure and to allow those skilled in the art to which the present disclosure pertains to fully understand a category of the disclosure, and the present disclosure is only defined by the scope of the claims. The same reference numeral refers to the same element throughout the specification.

Hereinafter, embodiments of the present disclosure are described in detail with reference to the accompanying drawings.

In describing the embodiments, descriptions of technical contents well known in the technical field to which the present disclosure pertains and which are not directly related to the present disclosure will be omitted. This is to more clearly convey the subject matter of the present disclosure without obscuring it by omitting unnecessary description.

For the same reason, some elements are enlarged, omitted or depicted schematically in the accompanying drawings. In addition, a size of each element does not entirely reflect its real size. The same reference numbers are assigned to the same or corresponding elements in each drawing.

Advantages and features of the present disclosure, and a method of achieving them will be apparent by referring to embodiments described below in detail with reference to the accompanying drawings. However, the present disclosure is not limited to the embodiments disclosed below and may be implemented in various different forms, only the present embodiments are provided to allow the disclosure of the present disclosure to be complete, and to allow those skilled in the art to which the present disclosure pertains to fully understand a category of the disclosure, and the present disclosure is only defined by the scope of the claims. The same reference numerals refer to the same components throughout the specification.

In so doing, it will be understood that each block of the process flowchart illustrations and combinations of the flowchart illustrations may be executed by computer program instructions. Since these computer program instructions may be mounted on the processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Further, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term 'unit' as used in the present embodiment means software or a hardware component such as a field programmable gate array (FPGA) or an application-specific integrated circuit (ASIC), and 'unit' performs specific roles. However, 'unit' is not limited to software or hardware. 'unit' may be configured to reside on an addressable storage medium and configured to reproduce on one or more processors. Accordingly, 'unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and 'unit' may be combined to fewer components and '~units' or may be further separated into additional components and '~units'. Furthermore, the components and '~units' may be implemented to reproduce one or more central processing units (CPUs) within a device or a security multimedia card. Also, 'unit' in one embodiment may include one or more processors.

A 5th generation (5G) system considers supporting various services compared to an existing 4G system. For example, services of the 5G system may include a mobile ultra-wideband communication service (enhanced mobile broad band (eMBB)), ultra-reliable and low latency communication (URLLC), massive machine type communication (mMTC), and evolved multimedia broadcast/multicast Service (eMBMS). The services of the 5G system described above are exemplary, and the possible services of the 5G system are not limited to the examples described above. A system providing the URLLC service may be referred to as a URLLC system, and a system providing the eMBB service may be referred to as an eMBB system. Also, the terms service and system may be used interchangeably or mixed.

As above, a plurality of services may be provided to a user in the communication system, and a method and an apparatus using the same for providing each service within the same time period according to characteristics are required to provide the plurality of the services to the user.

Meanwhile, in the wireless communication system, for example, a long term evolution (LTE) or a LTE-advanced (LTE-A) system, or a 5G new radio (NR) system, a base station may transmit downlink control information (DCI) including resource allocation information for downlink signal transmission to a terminal, through a physical downlink control channel (PDCCH). The terminal may be configured to receive at least one downlink signal (e.g., channel-state information reference signal (CSI-RS)), a physical broadcast channel (PBCH), or a physical downlink shared channel (PDSCH).

For example, the base station may transmit the DCI instructing the terminal to receive the PDSCH in a slot n over the PDCCH in the slot n, and the terminal receiving the DCI may receive the PDSCH in the slot n according to the received DCI.

In addition, in the LTE, LTE-A or NR system, the base station may be configured to transmit the DCI including uplink resource allocation information to the terminal over the downlink control channel (PDCCH), so that the terminal transmits to the base station at least one uplink signal (e.g., a sounding reference signal (SRS) or uplink control information (UCI), or a physical random access channel (PRACH)) or a physical uplink shared channel (PUSCH).

For example, the terminal receiving configuration information for uplink transmission (or DCI or UL grant including the resource allocation information for the uplink transmission) transmitted from the base station over the PDCCH may perform uplink data channel transmission (hereinafter, PUSCH transmission), according to a predefined time (e.g., n+4), a time (e.g., n+4) set through an upper signal (e.g., n+k), or transmission time indicator information (e.g., n+k) of the uplink signal included in the configuration information for the uplink transmission.

If the configured downlink transmission is transmitted from the base station to the terminal through an unlicensed spectrum, or the configured uplink transmission is transmitted from the terminal to the base station through an unlicensed band, the communication device (e.g., the base station or the terminal) may perform a channel access procedure (e.g., listen-before talk (LBT)) on the unlicensed band in which the signal transmission is configured before or immediately before the configured signal transmission start point, and if determining that the unlicensed band is idle according to a result of the channel access procedure, perform the configured signal transmission by accessing the unlicensed band. If determining that the unlicensed band is not idle or is occupied according to the channel access procedure performed by the communication device, the communication device, which may not access the unlicensed band, may not perform the configured signal transmission.

Hereafter, in various embodiments of the present disclosure, the channel access procedure may include a procedure such as LBT in which the terminal or the base station identifies whether the channel of the unlicensed band is idle or occupied. In the channel access procedure of the unlicensed band in which the signal transmission is set, the communication device may receive a signal in the unlicensed band for a specific time or a time calculated according to a predefined rule (e.g., a time calculated through one random value selected at least by the base station or the terminal), and determine the idle state of the unlicensed band by comparing a received signal strength with a predefined threshold or a threshold calculated according to a function expressed with at least one variable of a channel bandwidth or a signal bandwidth for transmitting a signal to be transmitted, a transmit power level, and a beam width of the transmit signal.

For example, if the signal strength received for 25 us in the unlicensed band at the communication device is smaller than a predefined threshold−72 dBm, the communication device may determine that the unlicensed band is idle, and perform the configured signal transmission in the unlicensed band. At this time, a maximum time for the signal transmission may be limited according to a maximum channel occupancy time defined per country and region in the unlicensed band or a type of the communication device (e.g., a base station or a terminal, or a master device or a slave device). For example, in Japan, a base station or a terminal in a 5 GHz unlicensed band may occupy an idle channel by performing the channel access procedure, and then transmit a signal by occupying the channel without performing an additional channel access procedure for up to 4 ms. If the received signal strength for 25 us is greater than the predefined threshold−72 dBm, the communication device may determine that the unlicensed band is not idle, and may not transmit the signal.

In the 5G communication system, various technologies such as a technique for transmitting an uplink signal without uplink scheduling (e.g., grant-free uplink transmission), code block group (CGB) based retransmission will be introduced to provide various services and support a high data transfer rate. Hence, to perform the 5G communication over the unlicensed band, a more efficient channel access procedure considering various variables is required.

The wireless communication system is advancing, beyond providing an initial voice-oriented service, for example, to a broadband wireless communication system which provides a high-speed and high-quality packet data service together with communication standards such as high speed packet access (HSPA) of 3rd Generation Partnership Project (3GPP), LTE or evolved universal terrestrial radio access (E-UTRA), LTE-A, high rate packet data (HRPD) of 3GPP2, ultra mobile broadband (UMB), and IEEE 802.16e. In addition, a 5G or NR communication standard is being developed as the 5G wireless communication system.

As such, at least one of enhanced mobile broadband (eMBB), massive machine type communications (mMTC) and ultra-reliable and low-latency communications (URLLC) may be provided to the terminal in the wireless communication system including the 5G. The above-mentioned services may be provided to the same terminal in the same time period. In an embodiment, the eMBB may be a serving aiming at a high-speed transmission of high-capacity data, mMTC may be a serving aiming at terminal power minimization and multi-terminal access, and the URLLC may be a serving aiming at high reliability and low latency, but not limited thereto. The three services may be major scenarios in the LTE system or the post-LTE 5G/NR system, but are not limited to the above examples.

In the following, the base station is an entity which performs resource allocation for the terminal, and may include at least one of an eNode B, a Node B, a base station (BS), a radio access unit, a base station controller, or a node on a network. The terminal may include at least one of a user equipment (UE), a mobile station (MS), a cellular phone, a smart phone, a computer, or a multimedia system for performing a communication function. In the present disclosure, a downlink (DL) indicates a radio transmission path of a signal transmitted by the base station to the terminal, and an uplink (UL) indicates a radio transmission path of a signal transmitted by the terminal to the base station. Hereafter, an embodiment of the present disclosure is described with an example of the LTE or LTE-A system, and terms of a physical channel and a signal of the conventional LTE or LTE-A system may be used to describe the method and the apparatus suggested in the present disclosure. An embodiment of the present disclosure may be applied to other communication systems having similar technical background or channel type to the mobile communication system described in the present disclosure. For example, the 5G mobile communication technology (5G, NR) developed after the LTE-A may be included. In addition, the embodiment of the present disclosure may be applied to other communication system through some modifications within a range not significantly departing from the scope of the present disclosure as determined by a person having skilled technical knowledge.

As a representative example of the broadband wireless communication system, the NR system adopts an orthogonal frequency division multiplexing (OFDM) scheme in the DL, and adopts both of the OFDM and a single carrier frequency division (SC-FDMA) multiple access scheme in the UL. The multiple access scheme may distinguish data or control information of each user, by allocating and operating them, not to overlap time-frequency resources carrying the data or the control information of each user, that is, to establish orthogonality.

The NR system adopts a hybrid automatic repeat request (HARQ) scheme which retransmits corresponding data in a physical layer, if decoding failure occurs in an initial transmission. In the HARQ scheme, if a receiver may not correctly decode the data, the receiver transmits information (e.g., a negative acknowledgment (NACK)) to a transmitter informing of the decoding failure, and thus the transmitter may retransmit the corresponding data in the physical layer. The receiver may improve data reception performance by combining the data retransmitted by the transmitter with the data previously failed in decoding. In addition, if the receiver correctly decodes the data, the HARQ scheme may allow to transmit information informing of decoding success (e.g., ACK) and the base station to transmit new data.

The present disclosure now describes a method and an apparatus for radio resource allocation in an unlicensed band. More specifically, the present disclosure provides a method and an apparatus for dividing a broadband frequency band into subbands, performing a channel access procedure for each subband, and, if determining that all or some subbands are idle based on a result of the channel access procedure, transmitting a DL or UL signal through the subband determined to be idle in a wireless communication system, particularly, in a system including a node which receives a DL signal using a broadband frequency or a node which is to transmit a UL signal in the unlicensed band. In so doing, the base station or the terminal which transmits the signal may transmit to the terminal or the base station information of the subband determined to be idle through the channel access procedure in the broadband frequency band, for example, the result of the channel access procedure of each subband, and the terminal or the base station receiving it may correctly receive the DL or UL signal using the result of the channel access procedure.

Terms indicating signals, terms indicating channels, terms indicating control information, terms indicating network entities, and terms indicating components of a device used in the following descriptions are illustrated only for convenience of description. Accordingly, the present disclosure is not limited to the terms to be described, and other terms having the same technical meaning may be used.

In addition, the present disclosure describes various embodiments using terms used in some communication standards (e.g., 3rd generation partnership project (3GPP)), which are merely exemplary for explanations. Various embodiments of the present disclosure may be easily modified and applied in other communication systems.

FIG. 1 illustrates a wireless communication system according to various embodiments of the present disclosure. FIG. 1 depicts a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure for providing radio access to the terminals 120 and 130. The base station 110 has coverage defined as a specific geographical area based on a signal transmission distance. The base station 110 may be referred to as, besides the base station, an access point (AP), an eNodeB (eNB), a gNodeB (gNB), a 5th generation node (5G node), a wireless point, a transmission/reception point (TRP), or other terms having the technically equivalent meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs MTC, and may not be carried by the user. The terminal 120 and the terminal 130 each may be referred to as, besides the terminal, a UE, a mobile station, a subscriber station, a remote terminal, a wireless terminal, a user device, or other term having the technically equivalent meaning.

A wireless communication environment 100 may include wireless communication in an unlicensed band. The base station 110, the terminal 120, and the terminal 130 may transmit and receive radio signals in the unlicensed band (e.g., 5-7 GHz, 64-71 GHz). A cellular communication system and another communication system (e.g., a wireless local area network (WLAN)) may coexist in the unlicensed band. To ensure fairness between two communication systems, that is, to prevent one system from exclusively using the channel, the base station 110, the terminal 120, and the terminal 130 may perform the channel access procedure for the unlicensed band. As an example of the channel access procedure for the unlicensed band, the base station 110, the terminal 120, and the terminal 130 may perform LBT.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams through a beam search or beam management procedure. After the serving beams are selected, communications may be performed using resources which are quasi co-located (QCL) with resources which carry the serving beams.

Figure 2:
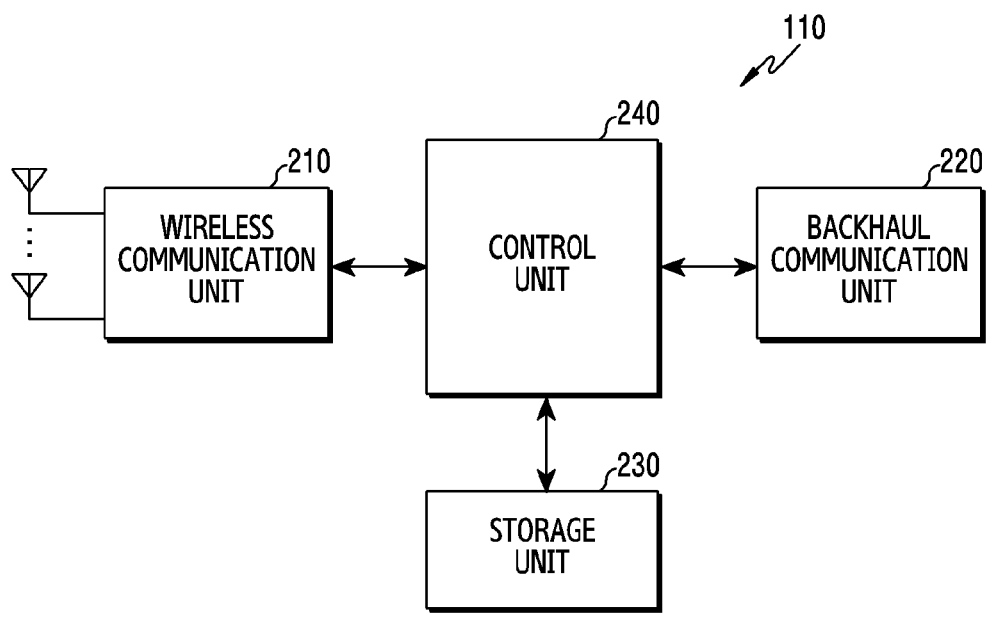
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as '~ portion' or '~ er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal and then transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power and an operating frequency. The digital unit may be implemented with at least one processor (e.g., a digital signal processor (DSP)).

The wireless communication unit 210 transmits and receives the signals as stated above. Hence, whole or part of the wireless communication unit 210 may be referred to as 'a transmitter', 'a receiver', or 'a transceiver'. Also, in the following explanations, the transmission and the reception over the radio channel is used as the meaning which embraces the above-stated processing of the wireless communication unit 210. According to an embodiment, the wireless communication unit 210 may include at least one transceiver.

The backhaul communication unit 220 provides an interface for communicating with other nodes in the network. That is, the backhaul communication unit 220 converts a bit sting transmitted from the base station to other node, for example, to other access node, other base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory or a combination of a volatile memory and a non-volatile memory. The storage unit 230 provides the stored data at a request of the control unit 240. According to an embodiment, the storage unit 230 may include a memory.

The control unit 240 controls general operations of the base station. For example, the control unit 240 transmits and receives signals through the wireless communication unit 210 or through the backhaul communication unit 220. Also, the control unit 240 records and reads data in and from the storage unit 230. The control unit 240 may execute functions of a protocol stack requested by a communication standard. According to another embodiment, the protocol stack may be included in the wireless communication unit 210. According to an embodiment, the control unit 240 may include at least one processor.

According to various embodiments, the control unit 240 may control the base station to perform operations according to various embodiments described below. For example, the control unit 240 may perform the channel access procedure for the unlicensed band. For example, a transceiver (e.g., the wireless communication unit 210) may receive signals transmitted in the unlicensed band, and the control unit 240 may determine whether the unlicensed band is idle by comparing a strength of the receive signal with a threshold predefined or determined with a function value having a factor such as a bandwidth. In addition, for example, the control unit 240 may transmit a control signal to the terminal, or receive a control signal from the terminal through the transceiver. Also, the control unit 240 may transmit data to the terminal or receive data from the terminal through the transceiver. The control unit 240 may determine a transmission result of the signal transmitted to the terminal, based on the control signal or the data signal received from the terminal. Also, for example, based on the transmission result, that is, based on the reception result of the terminal for the control signal or data signal, the control unit 240 may maintain or change a contention window value (hereinafter, contention window adjustment) for the channel access procedure. According to various embodiments, the control unit 240 may determine a reference slot, to obtain the transmission result for the contention window adjustment. The control unit 240 may determine a data channel for the content window adjustment in the reference slot. The control unit 240 may determine a reference control channel for the content window adjustment in the reference slot. If determining that the unlicensed band is idle, the control unit 240 may occupy the channel.

Figure 3:
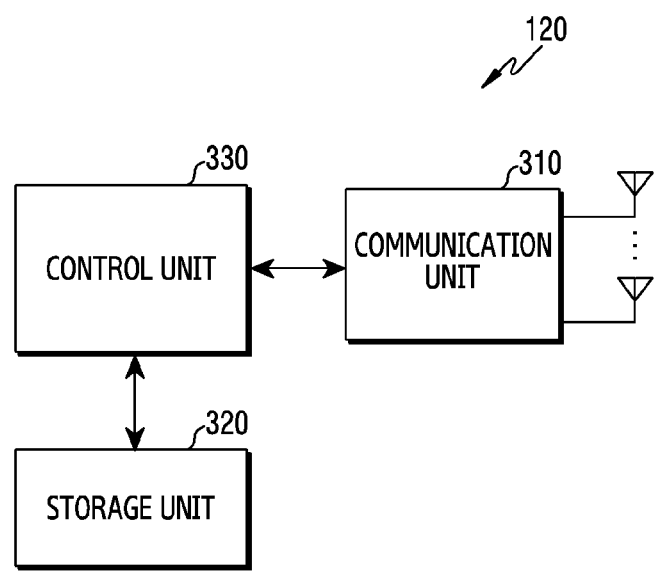
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as '~ portion' or '~ er' used hereafter indicates a unit for processing at least one function or operation, and may be implemented using hardware, software, or a combination of hardware and software.

Referring to FIG. 3, the terminal 120 includes a communication unit 310, a storage unit 320, and a control unit 330.

The communication unit 310 may perform functions for transmitting and receiving signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal and then transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In terms of of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 transmits and receives the signals as stated above. Hence, whole or part of the communication unit 310 may be referred to as 'a transmitter', 'a receiver' or 'a transceiver'. In addition, the transmission and the reception over the radio channel are used as the meaning which embraces the above-stated processing of the communication unit 310 in the following explanations. According to an embodiment, the communication unit 310 may include at least one transceiver.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330. According to an embodiment, the storage unit 320 may include a memory.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. According to an embodiment, the control unit 330 may include at least one processor. In addition, according to an embodiment, part of the communication unit 310 and/or the control unit 330 may be referred to as a communication processor (CP).

According to various embodiments, the control unit 330 may control the terminal to carry out operations to be explained according to various embodiments. For example, the control unit 330 may receive a DL signal (a DL control signal or DL data) transmitted by the base station, through a transceiver (e.g., the communication unit 310). In addition, for example, the control unit 330 may determine a transmission result of the DL signal. The transmission result may include feedback information of ACK, NACK, DTX, and so on of the transmitted DL signal. In the present disclosure, the transmission result may be referred to as various terms such as a reception state, a reception result, a decoding result, and HARQ-ACK information of the DL signal. In addition, for example, the control unit 330 may transmit a UL signal, as a response signal to the DL signal, to the base station, through the transceiver. The UL signal may explicitly or implicitly include the transmission result of the DL signal.

The control unit 330 may perform the channel access procedure for the unlicensed band. For example, the transceiver (e.g., the communication unit 310) may receive signals transmitted in the unlicensed band, and the control unit 330 may determine whether the unlicensed band is idle by comparing a strength of the receive signal with a threshold predefined or determined to a function value having a factor such as a bandwidth. The control unit 330 may perform the access procedure on the unlicensed band to transmit a signal to the base station.

Figure 4:
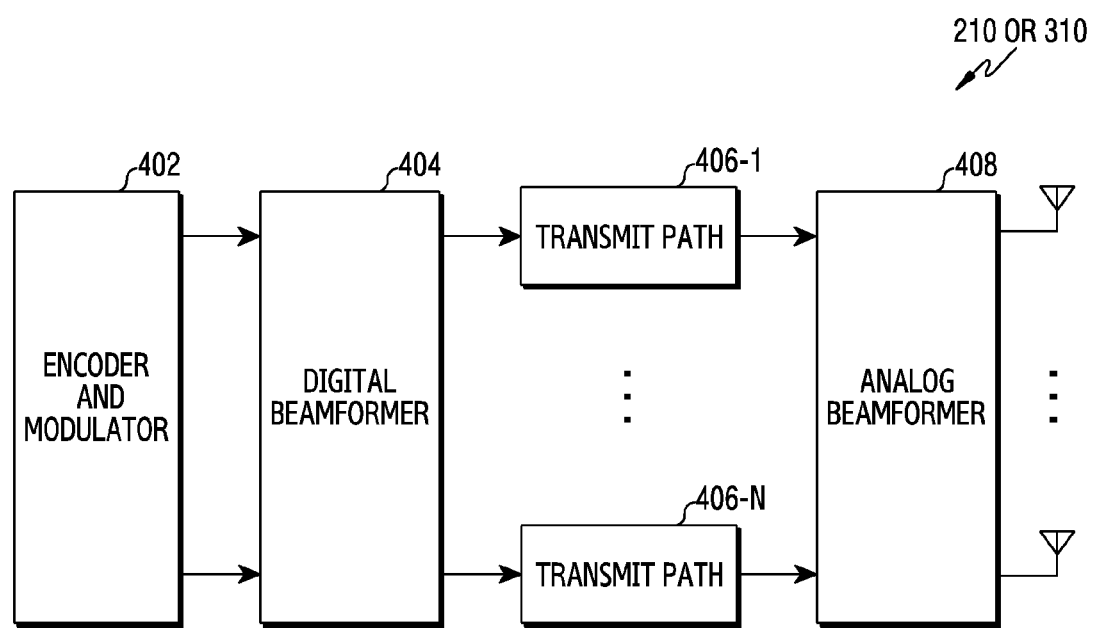
FIG. 4 illustrates a configuration of a communication unit in a wireless communication system according to various embodiments of the present disclosure.

FIG. 4 illustrates a configuration of a communication unit in a wireless communication system according to various embodiments of the present disclosure. FIG. 4 depicts an example of a detailed configuration of the wireless communication unit 210 of FIG. 2 or the communication unit 310 of FIG. 3. More specifically, FIG. 4 depicts components for performing the beamforming, as part of the wireless communication unit 210 of FIG. 2 or the communication unit 310 of FIG. 3.

Referring to FIG. 4, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols by performing constellation mapping.

The digital beamformer 404 beamforms a digital signal (e.g., modulation symbols). For doing so, the digital beamformer 404 multiplies the modulation symbols by beamforming weights. Herein, the beamforming weights are used to change an amplitude and a phase of the signal, and may be referred to as a 'precoding matrix' or a 'precoder'. The digital beamformer 404 outputs the digital-beamformed modulation symbols to the plurality of the transmit paths 406-1 through 406-N. In so doing, according to a multiple input multiple output (MIMO) transmission scheme, the modulation symbols may be multiplexed or the same modulation symbols may be provided to the plurality of the transmit paths 406-1 through 406-N.

The plurality of the transmit paths 406-1 through 406-N convert the digital-beamformed digital signals to analog signals. For doing so, the transmit paths 406-1 through 406-N each may include an inverse fast Fourier transform (IFFT) operator, a cyclic prefix (CP) adder, a DAC, and an up-converter. The CP adder is used for an OFDM scheme, and may be excluded if other physical layer scheme (e.g., filter bank multi-carrier (FBMC)) is applied. That is, the plurality of the transmit paths 406-1 through 406-N provide an independent signal process for a plurality of streams generated through the digital beamforming. Yet, depending on the implementation, some of the components of the transmit paths 406-1 through 406-N may be used in common.

The analog beamformer 408 beamforms the analog signals. For doing so, the analog beamformer 408 multiplies the analog signals by the beamforming weights. Herein, the beamforming weights are used to change the amplitude and the phase of the signal. Specifically, the analog beamformer 408 may be configured variously, according to a connection structure between the transmit paths 406-1 through 406-N and the antennas. For example, the plurality of the transmit paths 406-1 through 406-N each may be connected with one antenna array. As another example, the plurality of the transmit paths 406-1 through 406-N may be connected with one antenna array. As yet another example, the plurality of the transmit paths 406-1 through 406-N may be adaptively connected with one antenna array, or two or more antenna arrays.

Figure 5:
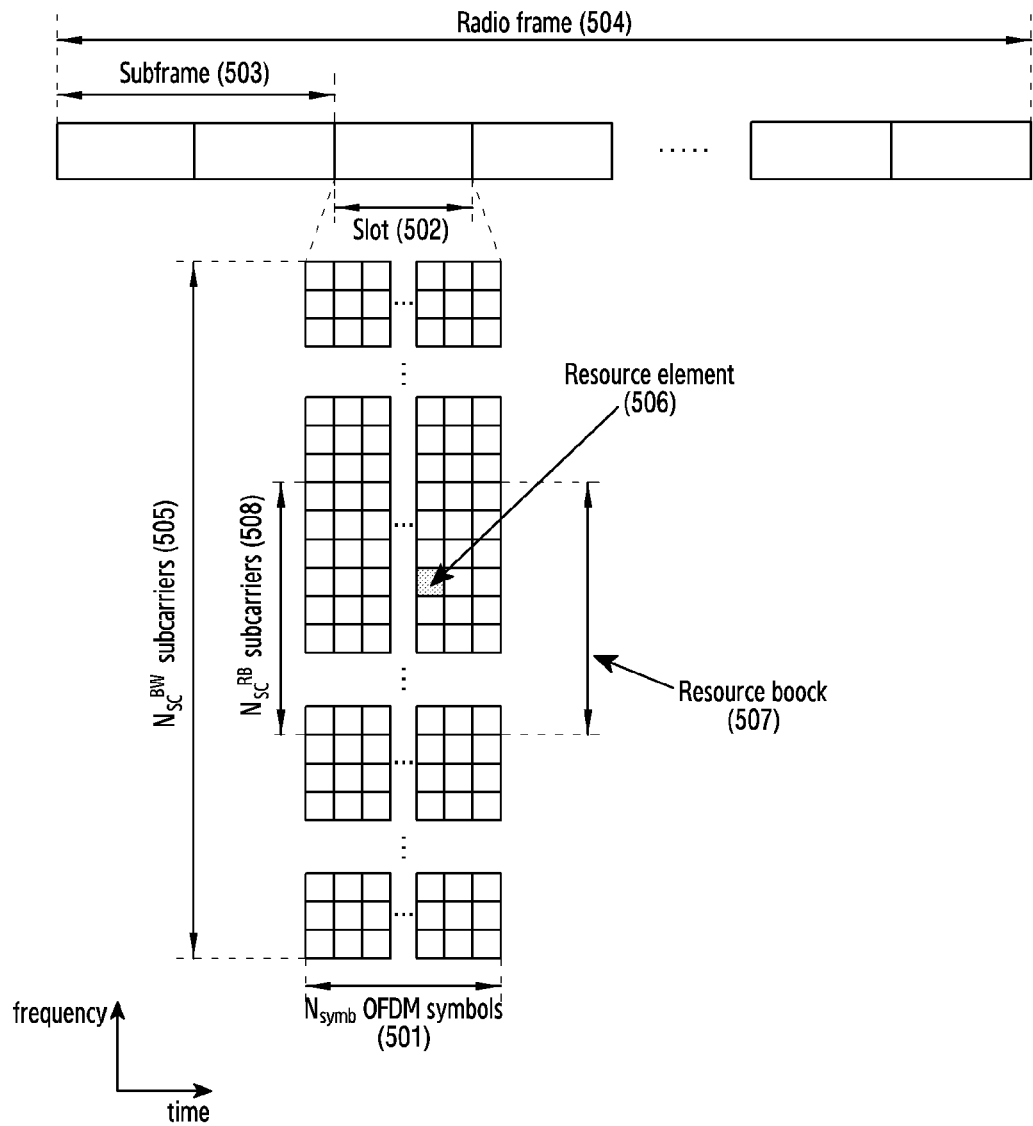
FIG. 5 illustrates an example of a radio resource region in a wireless communication system according to various embodiments of the present disclosure.

FIG. 5 illustrates an example of a radio resource region in a wireless communication system according to various embodiments of the present disclosure. In various embodiments, the radio resource region may include a structure of a time-frequency domain. In various embodiments, the wireless communication system may include an NR communication system.

Referring to FIG. 5, a horizontal axis indicates the time domain, and the vertical axis indicates the frequency domain in the radio resource region. A minimum transmission unit of the time domain may be an OFDM and/or discrete fourier transform (DFT)-spread-OFDM (DFT-s-OFDM) symbol, and Nsymb-ary OFDM and/or DFT-s-OFDM symbols 501 may be gathered to form one slot 502. In various embodiments, the OFDM symbol may include a symbol for transmitting and receiving signals using the OFDM multiplexing scheme, and the DFT-s-OFDM symbol may include a symbol for transmitting and receiving signals using DFT-s-OFDM or single carrier frequency division multiple (SC-FDMA) multiplexing scheme. Hereafter, the present disclosure describes an embodiment for the OFDM symbol for the sake of descriptions, but such an embodiment is also applicable to an embodiment for the DFT-s-OFDM symbol. In addition, the present disclosure describes an embodiment for DL signal transmission and reception for the sake of descriptions, which may also be applicable to an embodiment for UL signal transmission and reception.

If a subcarrier spacing (SCS) is 15 kHz, one slot 502 constitutes one subframe 503, and the slot 502 and the subframe 503 each may be 1 ms in length, unlike FIG. 5. In various embodiments, the number of the slots 502 constituting one subframe 503 and the length of the slot 502 may vary depending on the SCS. For example, if the SCS is 30 kHz, two slots 502 may constitute one subframe 503 as shown in FIG. 5. At this time, the length of the slot 502 is 0.5 ms, and the length of the subframe 503 is 1 ms. A radio frame 504 may be a time domain period including 10 subframes. A minimum transmission unit of the frequency domain is the subcarrier, and a carrier bandwidth constituting a resource grid may include NscBW-ary subcarriers 505 in total.

Notably, the SCS, the number of the slots 502 in the subframe 503, the length of the slot 502, and the length of the subframe 503 may be variably applied. For example, in the LTE system, the SCS is 15 kHz, and two slots constitute one subframe 503, wherein the length of the slot 502 may be 0.5 ms and the length of the subframe 503 may be 1 ms. As another example, in the NR system, the SCS ($\mu$) may be one of 15 kHz, 30 kHz, 60 kHz, 120 kHz, and 240 kHz, and the number of slots in one subframe may be 1, 2, 4, 8, or 16 according to the SCS ($\mu$).

A basic unit of the resource in the time-frequency domain may be a resource element (RE) 506, and the RE 506 may be expressed with an OFDM symbol index and a subcarrier index. A resource block may include a plurality of REs. In the LTE system, the resource block (RB) (or a physical resource block (PRB)) may be defined as Nsymb-ary consecutive OFDM symbols in the time domain and NSCRB-ary consecutive subcarriers in the frequency domain. The number of the symbols included in one RB may be Nsymb=14, the number of the subcarriers may be NSCRB=12, the number of the symbols in one RB may be Nsymb=7, the number of the subcarriers may be NSCRB=12, and the number of the RBs (NRB) may vary depending on the bandwidth of the system transmission band. In the NR system, an RB 507 may be defined as NSCRB-ary consecutive subcarriers in the frequency domain. The number of subcarriers may be NSCRB=12. The frequency domain may include common resource blocks (CRBs). The PRB may be defined in a bandwidth part (BWP) on the frequency domain. CRB and PRB numbers may be determined differently according to the SCS.

The DCI may be transmitted in initial N-ary OFDM symbol(s) of the slot. In general, N={1, 2, 3}, and the terminal may configure the number of the symbols for carrying the DCI through higher layering signaling from the base station. In addition, the base station may change the number of the symbols for carrying the DCI in the slot for each slot according to an amount of control information to transmit in the current slot, and transmit information of the number of the symbols to the terminal over a separate DL control channel.

Scheduling information of DL data or UL data in the NR and/or LTE system may be transmitted from the base station to the terminal through the DCI. In various embodiments, the DCI may be defined according to various formats, and each format may indicate whether the DCI includes the scheduling information (e.g., UL grant) of the UL data or the scheduling information (DL grant) of the DL data, whether a size of the control information is compact DCI or fall-back DCI, whether spatial multiplexing using multiple antennas is applied, and/or whether the DCI is DCI for power control. For example, the DCI format (e.g., DCI format 1_0 of NR) which is the scheduling control information (DL grant) of the DL data may include at least one of the following control information. NR DCI format 1_0 may include the scheduling of the DL data.

DCI format identifier: an identifier for identifying the DCI format

Frequency domain resource assignment: indicating the RB allocated for data transmission.

Time domain resource assignment: indicating slots and symbols allocated for data transmission.

VRB-to-PRB mapping: indicating whether to apply a virtual resource block (VRB) mapping scheme Modulation and coding scheme (MCS): indicating a modulation scheme used for the data transmission and a size of a transport block which is data to be transmitted.

New data indicator: indicating HARQ initial transmission or retransmission.

Redundancy version: indicating a redundancy version of HARQ.

HARQ process number: indicating an HARQ process number.

PDSCH allocation information (DL assignment index): indicating to the terminal the number of PDSCH reception results (e.g., the number of HARQ-ACKs) to be reported to the base station Transmit power control (TPC) command for physical uplink control channel (PUCCH): indicating a TPC command for PUCCH which is a UL control channel.

PUCCH resource indicator: indicating a PUCCH resource used for the HARQ-ACK report including the reception result of the PDSCH configured through the DCI PUCCH transmission timing indicator (PDSCH-to-HARQ_feedback timing indicator): indicating slot or symbol information for carrying the PUCCH for the HARQ-ACK report including the reception result of the PDSCH set through the corresponding DCI The DCI may be transmitted on a physical DL control channel (PDCCH) (or control information, hereinafter interchangeably used) or an enhanced PDCCH (EPDCCH) (or enhanced control information, hereinafter interchangeably used) which is a DL physical control channel, through a channel coding and modulation processes. Hereinafter, transmission and reception of the PDCCH or the EPDCCH may be understood as DCI transmission and reception on the PDCCH or the EPDCCH, and transmission and reception of the PDSCH may be understood as DL data transmission and reception on the PDSCH.

In various embodiments, the DCI is added with cyclic redundancy check (CRC) scrambled with a specific radio network temporary identifier (RNTI) (or a terminal ID C-RNTI) independent with respect to each terminal, and the DCI for each terminal may channel-coded and then configured and transmitted as the independent PDCCH. The PDCCH in the time domain may be transmitted in a control channel transmission period. A mapping position of the PDCCH in the frequency domain may be determined by at least the ID of each terminal, and may be transmitted in a whole system transmission band or some band of the system transmission band.

DL data may be transmitted on the PDSCH which is the physical channel for the DL data transmission. The PDSCH may be transmitted after the control channel transmission period, and scheduling information such as a mapping position of the PDSCH in the frequency domain, and a modulation scheme for the PDSCH may be determined based on DCI transmitted over the PDCCH.

Through the MCS of the control information of the DCI, the base station may notify the modulation scheme applied to the PDSCH to be transmitted to the terminal and a data size to be transmitted (transport block size (TBS)). In various embodiments, the MCS may include 5 or more or less bits. The TBS corresponds to a TB size before the channel coding for error correction is applied to the data (TB) to be transmitted by the base station.

The modulation scheme supported for the DL data transmission in the NR system may include at least one of quadrature phase shift keying (QPSK), 16 quadrature amplitude modulation (16QAM), 64QAM, and 256QAM, and their modulation order Qm may be 2, 4, 6, and 8 respectively. That is, the QPSK modulation may transmit 2 bits per symbol, the 16QAM modulation may transmit 4 bits per symbol, the 64QAM modulation may transmit 6 bits per symbol, and the 256QAM modulation may transmit 8 bits per symbol. In addition, a modulation scheme over the 256QAM may be used depending on system modifications.

In the NR system, the UL/DL HARQ may include an asynchronous HARQ scheme having a data retransmission time point which is not fixed. For example, in the DL, if the base station receives HARQ NACK feedback from the terminal with respect to initial transmission data, the base station may freely determine the transmission time point of retransmission data according to a scheduling operation. The terminal may buffer data determined to be erroneous as a result of decoding the received data for the HARQ operation, and perform combining with the data retransmitted from the base station. The HARQ ACK/NACK information of the PDSCH transmitted in slot n-k may be transmitted from the terminal to the base station over the PUCCH or the PUSCH in slot n.

According to an embodiment, in the 5G communication system such as NR, the k value may be transmitted in the DCI indicating or scheduling the reception of the PDSCH transmitted in the slot n-k, or may be set to the terminal through higher layer signaling. The base station may set one or more k values to the terminal through the higher layer signaling, or may indicate a specific k value to the terminal through the DCI. k may be determined according to HARQ-ACK processing capability of the terminal, that is, a minimum time required for the terminal to receive the PDSCH and generate and report the HARQ-ACK of the PDSCH. In addition, the terminal may use a predefined value or a default value as the value k until the k value is set.

Various embodiments of the present disclosure are described based on the NR system, but the content of the present disclosure is not limited to the NR system and may be applied to various wireless communication systems such as LTE, LTE-A, LTE-A-Pro, and 5G. In addition, the content of the present disclosure describes a system and an apparatus for transmitting and receiving signals using the unlicensed band, but the content of the present disclosure may also be applicable to a system which operates in a licensed band.

Hereafter, in the present disclosure, the higher layer signaling or the higher signal may be the signal transmission method from the base station to the terminal using the DL data channel of the physical layer, or from the terminal to the base station using the UL data channel of the physical layer, and may include at least one of radio resource control (RRC) signaling, packet data convergence protocol (PDCP) signaling, or a signal transmission method transmitted through media access control (MAC) control element (CE). In addition, the higher layer signaling or the higher signal may include system information commonly transmitted to a plurality of terminals, for example, system information block (SIB).

In a system which performing communication in the unlicensed band, the communication device (the base station or the terminal) for transmitting a signal through the unlicensed band may perform the channel access procedure or the LBT for the unlicensed band for the communication before transmitting the signal, and perform the signal transmission by accessing the unlicensed band, if determining that the unlicensed band is idle according to the channel access procedure. If determining that the unlicensed band is not idle according to the channel access procedure performed, the communication device may not perform the signal transmission.

The channel access procedure of the unlicensed band may be distinguished according to whether a channel access procedure initiation time point of the communication device is fixed (frame-based equipment (FBE)) or variable (load-based equipment (LBE)). The communication device may be determined as an FBE device or an LBE device depending on whether a transmit/receive structure of the communication device has one cycle or no cycle, in addition to the channel access procedure initiation time point. Herein, the fixed channel access procedure initiation time point means that the channel access procedure of the communication device may be periodically initiated according to a predefined cycle or a cycle declared or set by the communication device. For another example, the fixed channel access procedure initiation time point may mean that the transmit or receive structure of the communication device has one cycle. Herein, the variable channel access procedure initiation time point means that the channel access procedure initiation time point of the communication device may vary at any time if the communication device intends to transmit a signal through the unlicensed band. For another example, the variable channel access procedure initiation time point may mean that the transmit or receive structure of the communication device may be determined if necessary without having one cycle.

Now, the channel access procedure of the variable channel access procedure initiation time point of the communication device (LBE) (hereinafter, a traffic-based channel access procedure or an LBE-based channel access procedure) is described.

The channel access procedure of the unlicensed band may include a procedure where the communication device determines whether the unlicensed band is idle by measuring a signal strength received through the unlicensed band for a fixed time or a time calculated according to a predefined rule (e.g., a time calculated through one random value selected by at least the base station or the terminal), and comparing it with a predefined threshold or a threshold calculated by a function which determines the received signal strength according to at least one variable of a channel bandwidth, a signal bandwidth carrying the signal to transmit, and/or a transmit power level.

For example, the communication device may measure the received signal strength for Xus (e.g., 25 μs) immediately before the signal transmission timing, and if the measured signal strength is smaller than a predefined value or a calculated threshold T (e.g., −72 dBm), determine that the unlicensed band is idle and transmit the configured signal. At this time, after the channel access procedure, a maximum time for continuous signal transmission may be limited according to the maximum channel occupancy time defined for each country, region, and frequency band according to each unlicensed band, and may be also limited depending on the type of the communication device (e.g., the base station or the terminal, or the master device or the slave device). For example, in Japan, a base station or a terminal in 5 GHz unlicensed band may perform the channel access procedure and then transmit a signal in the unlicensed band determined to be idle by occupying the channel without performing an additional channel access procedure for up to 4 ms.

More specifically, if the base station or the terminal intends to transmit a DL or UL signal in the unlicensed band, the channel access procedure for the base station or the terminal may be divided into at least the following types.

Type 1: perform the channel access procedure for a variable time and then transmit the UL/DL signal Type 2: perform the channel access procedure for a fixed time and then transmit the UL/DL signal Type 3: transmit the DL or UL signal without conducting the LBT procedure which determines channel occupancy by other node in the channel access procedure A transmitting device (e.g., a base station or a terminal) for transmitting a signal in the unlicensed band may determine the channel access procedure scheme (or type) according to the type of the signal to transmit. In the 3GPP, the LBT procedure which is the channel access scheme may be divided into four categories. The four categories may include a first category which does not perform the LBT, a second category which performs the LBT without random backoff, a third category which performs the LBT through the random backoff in a fixed-size contention window, and a fourth category which performs the LBT through the random backoff in a variable-size contention window. According to an embodiment, the fourth category may be exemplified for Type 1, the second category may be exemplified for Type 2, and the first category may be exemplified for Type 3.

Now, the present disclosure assumes that the transmitting device is the base station for the sake of description, and the transmitting device and the base station may be used interchangeably.

For example, if the base station is to transmit a DL signal including a DL data channel in the unlicensed band, the base station may perform the channel access procedure of the Type 1 scheme. If the base station is to transmit a DL signal not including the DL data channel in the unlicensed band, for example, to transmit a synchronization signal or a DL control channel, the base station may perform the channel access procedure of the Type 2 scheme and transmit the DL signal.

At this time, the scheme of the channel access procedure may be determined according to a transmission length of the signal to transmit in the unlicensed band or a length of the time or the period used by occupying the unlicensed band. In general, the Type 1 scheme may perform the channel access procedure for a longer time than the channel access procedure of the Type 2 scheme. Hence, if the communication device is to transmit a signal for a short time period or a time equal to or less than a reference time (e.g., Xms or Y symbols), the channel access procedure of the Type 2 scheme may be performed. By contrast, if the communication device is to transmit a signal for a long time period or a time greater than the reference time (e.g., Xms or Y symbols), the channel access procedure of the Type 1 scheme may be performed. In other words, the channel access procedure of different types may be performed according to the use time of the unlicensed band.

If the transmitting device performs the channel access procedure of the Type 1 scheme according to at least one of the above references, the transmitting device may determine a channel access priority class (or a channel access priority) according to a quality of service class identifier (QCI) of the signal to transmit in the unlicensed band, and perform the channel access procedure by using at least one or more of predefined set values as shown in [Table 1] with respect to the determined channel access priority class. The following [Table 1] shows mapping relationship between channel access fand the QCI.

For example, QCI 1, 2, and 4 each indicate a QCI value for services such as conversational voice, conversational video (live streaming), and non-conversational video (buffered streaming). To transmit a signal for a service which is not match to the QCI in [Table 1] in the unlicensed band, the transmitting device may select the QCI closest to the service and the QCI of [Table 1] and select a corresponding channel access priority class.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

In various embodiments, a parameter value for the channel access priority class (e.g., a defer duration according to the determined channel access priority p, a set CW_p of contention window values or sizes and a minimum value and a maximum value CW_min,p and CW_max,p of the contention window, and a maximum channel occupancy time T_mcot,p) may be determined as shown in [Table 2]. [Table 2] shows the parameter value for the channel access priority class in the DL.

In other words, the base station which is to transmit a DL signal in the unlicensed band may perform the channel access procedure for a minimum T_f+mp*T_sl time (e.g., a defer duration 612) with respect to the unlicensed band. If the base station is to perform the channel access procedure with the channel access priority class 3 (p=3), the size of T_f+mp*T_sl may be configured using mp=3 with respect to the defer duration size T_f+mp*T_sl required for the channel access procedure. Herein, T_f is a fixed value (e.g., a period 610 of FIG. 6) of 16 μs, wherein the first T_s time is to be idle and the base station may not perform the channel access procedure at remaining time T_f-T_sl after time T_sl within the time T_f. At this time, even if the base station performs the channel access procedure at the remaining time T_f-T_sl, a result of the channel access procedure may not be used. That is, the time T_f-T_sl corresponds to the time deferring the channel access procedure at the base station.

If it is determined that the unlicensed band is idle throughout mp*T_sl time, N=N−1. At this time, N may be selected as an arbitrary integer value between 0 and the contention window value CW_p at the channel access procedure timing. For the channel access priority class 3, the minimum contention window value and the maximum contention window value are 15 and 63 respectively. If it is determined that the unlicensed band is idle at the defer duration and an additional period in which the channel access procedure is performed, the base station may transmit a signal over the unlicensed band for T_mcot,p time (8 ms). Meanwhile, [Table 2] shows the channel access priority class (or the channel access priority), in the DL. The present disclosure describes embodiments based on the DL channel access priority class for the convenience of the description. In the UL, the same channel access priority class of [Table 2] may be used, or a separate channel access priority class may be used for the UL transmission.

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value CW_p is the minimum value CW_min,p of the contention window. The base station selecting the value N may perform the channel access procedure in T_sl period (e.g., a slot period 620 of FIG. 6), change the value to N=N−1 if the unlicensed band is determined to be idle through the channel access procedure performed in the T_sl period, and transmit a signal through the unlicensed band for the maximum T_mcot,p time (e.g., a maximum channel occupancy time (MCOT) 630) if N=0. If the unlicensed band determined through the channel access procedure at T_sl time is not idle, the base station may perform the channel access procedure again without changing the value N.

The size of the contention window CW_p value may be changed or maintained according to a ratio Z of NACKs, among reception results ACK/NACK with respect to the DL data (e.g., DL data received in a reference subframe or a reference slot) transmitted or reported to the base station, by one or more terminals receiving DL data transmitted over a DL data channel in a reference subframe or a reference slot. In so doing, the reference subframe or the reference slot may be determined to a first subframe or slot of the most recently transmitted DL signal transmission period (or the MCOT) by the base station through the unlicensed band at a time point at which the base station initiates the channel access procedure, a time point at which the base station selects the N value to perform the channel access procedure or immediately before the two time points, or a starting subframe or a starting slot of the transmission period.

Figure 6:
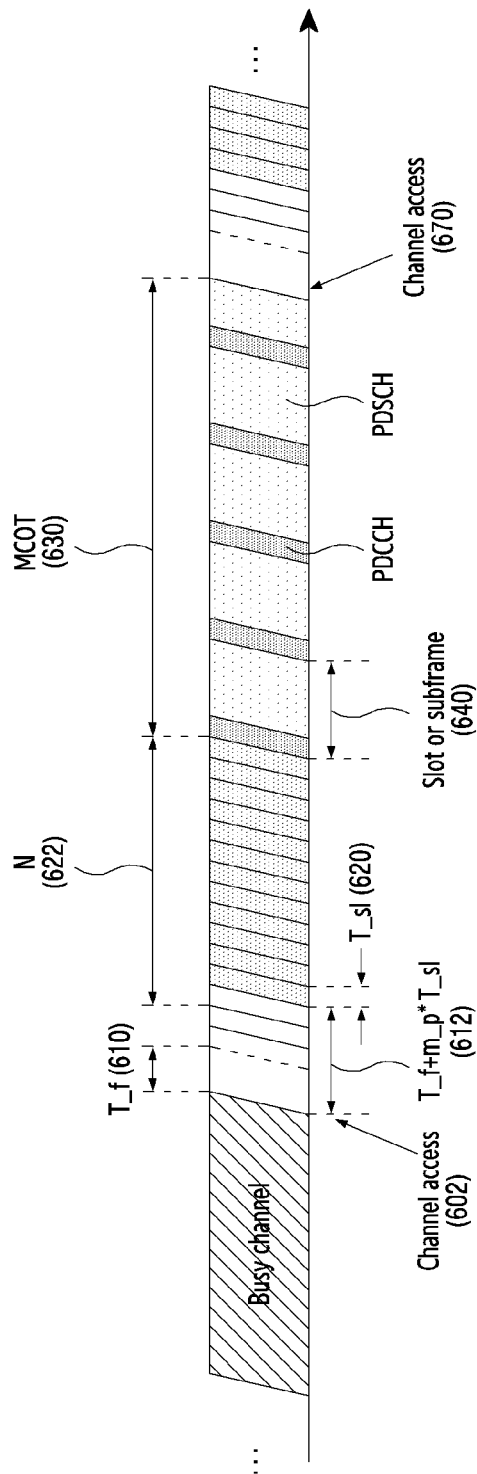
FIG. 6 illustrates an example of a channel access procedure of an unlicensed band in a wireless communication system according to various embodiments of the present disclosure.

FIG. 6 illustrates an example of a channel access procedure of an unlicensed band in a wireless communication system according to various embodiments of the present disclosure. It is described that the base station performs the channel access procedure to occupy the unlicensed band. The base station exemplifies the base station 110 of FIG. 1.

Referring to FIG. 6, to occupy the unlicensed band, the base station may attempt channel access. A first slot (or a starting slot initiating the channel occupancy time) or subframe 640 of the most recently transmitted DL signal transmission period (hereafter, COT) by the base station through the unlicensed band, a time point 670 of initiating the channel access procedure, or a time point at which the base station selects the N value to perform the channel access procedure may be defined as a reference slot or a reference subframe (hereafter, a reference slot). Specifically, one or more consecutive slots including the first slot transmitting the signal among all of slots in the COT 630 may be defined as the reference slot. In addition, according to an embodiment, if the COT starts after the first symbol of the slot, a starting slot of the DL signal transmission and its next slot may be defined as the reference slot. If a ratio of NACKs among reception results of DL data transmitted or reported to the base station by one or more terminals which receive the DL data transmitted over the DL data channel in such reference slots is equal to or greater than Z, the base station may determine the value or the size of the contention window used for the channel access procedure 670 of the corresponding base station, to a next greater contention window than the contention window used for the previous channel access procedure 602. In other words, the base station may increase the size of the contention window used in the channel access procedure 602. The base station may perform the next channel access procedure 670, by selecting the N value within a range defined according to the increased size of the contention window.

If the base station may not obtain the reception result of the DL data channel transmitted in the reference slot of the COT 630, for example, if a time interval between the reference slot and the channel access procedure initiation time point 670 of the base station is equal to or less than n slots or symbols (i.e., if the base station initiates the channel access procedure before the minimum time at which the terminal may report the reception result of the DL data channel transmitted in the reference slot to the base station), the first slot of the most recent COT transmitted before the COT 630 may be the reference slot.

In other words, if the base station may not receive from the terminal the reception result of the DL data transmitted in the reference slot 640 at the channel access procedure initiation time point 670 of the base station, at the N value selection time of the base station to perform the channel access procedure, or immediately the same, the base station may determine the contention window by using the DL data reception result of the terminal with respect to the reference slot of the most recent COT, among the reception results of the DL data channel previously received from terminals. The base station may determine the contention window size used in the channel access procedure 670, by using the DL data reception results received from the terminals with respect to the DL data transmitted through the DL data channel in the reference slot.

For example, the base station transmitting the DL signal through the channel access procedure (e.g., CW_p=15) configured according to the channel access priority class 3 (p=3) may increase the contention window from the initial value CW_p=15 to a next contention window value CW_p=31, if determining that 80% or more of the reception results of the terminal with respect to the DL data transmitted to the terminal through the DL data channel in the reference slot are NACKs, among the DL signals transmitted over the unlicensed band. The ratio value of 80% is exemplary, and other modifications may be possible.

If the reception results over 80% among the reception results of the terminal are not determined to the NACKs, the base station may maintain the contention window value as the existing value or change it to the initial value of the contention window. In so doing, changing the contention window may be commonly applied to all of the channel access priority classes, or only to the channel access priority class used for the channel access procedure. At this time, a method for determining a valid reception result in determining to change the contention window size, among the reception results of the DL data transmitted or reported by the terminal to the base station with respect to the DL data transmitted through the DL data channel, in the reference slot where the change of the contention window size is determined, namely, a method for determining the Z value is described as follows.

If the base station transmits at least one codeword (CW) or TB to one or more terminals in the reference slot, the base station may determine the value Z to the ratio of the NACKs among the reception results transmitted or reported by the terminal, with respect to the TB received in the reference slot. For example, if two CWs or two TBs are transmitted to one terminal in the reference slot, the base station may receive or be reported with a reception result of a DL data signal with respect to the two TBs from the terminal. If the ratio Z of the NACKs in the two reception results is equal to or greater than a threshold (e.g., Z=80%) which is predefined or set between the base station and the terminal, the base station may change or increase the contention window size.

In so doing, if the terminal bundles the DL data reception results with respect to one or more slots (e.g., M-ary slots) including the reference slot and transmit or report it to the base station, the base station may determine that the terminal transmits the M-ary reception results. The base station may determine the value Z with the ratio of the NACKs the among the M-ary reception results, and change, maintain, or initialize the contention window size.

If the reference slot is a second slot of two slots included in one subframe, or if the DL signal is transmitted starting from a symbol after the first symbol in the reference slot, the reference slot and the next slot may be determined to the reference slot, and the value Z may be determined to the NACK ratio, among the reception results transmitted or reported by the terminal to the base station with respect to the DL data received in the reference slot.

In addition, if scheduling information or DCI of the DL data channel transmitted by the base station is transmitted in the same cell or frequency band as a cell or frequency band in which the DL data channel is transmitted, or if the scheduling information or the DCI of the DL data channel transmitted by the base station is transmitted in the unlicensed band but in a different cell or a different frequency from the cell in which the DL data channel is transmitted, the base station may determine the terminal's reception result as the NACK and thus determine the Z value, if it is determined that the terminal does not transmit the reception result of the DL data received in the reference slot, and if the reception result of the DL data transmitted by the terminal is determined to be at least one of discontinuous transmission (DTX), NACK/DTX, or any state.

In addition, if the scheduling information or the DCI of the DL data channel transmitted by the base station is transmitted in the unlicensed band, if the reception result of the DL data transmitted by the terminal is determined to be at least one of the DTX, the NACK/DTX, or any state, the base station may not reflect the reception result of the terminal in the reference value Z of the contention window change. In other words, the base station may ignore the reception result of the terminal, and determine the value Z.

In addition, if the base station transmits the scheduling information or the DCI of the DL data channel through the licensed band, if the base station does not actually transmitted the DL data (no transmission), among the DL data reception results with respect to the reference slot transmitted or reported by the terminal to the base station, the base station may determine the Z value by ignoring the reception result transmitted or reported by the terminal with respect to the DL data.

Figure 7:
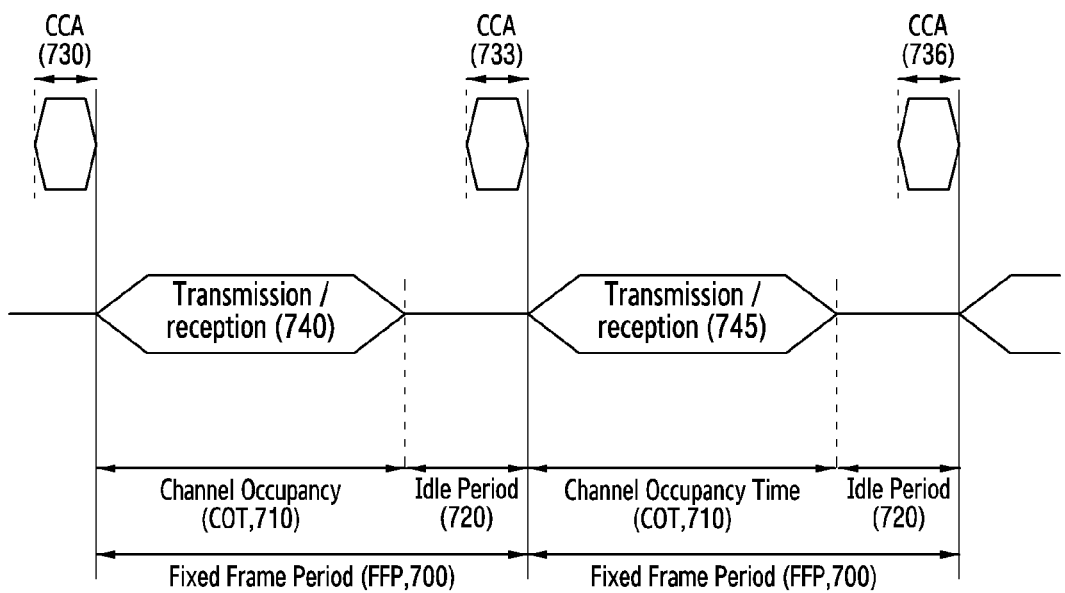
FIG. 7 illustrates another example of a channel access procedure of an unlicensed band in a wireless communication system according to various embodiments of the present disclosure.

Hereafter, the channel access procedure if the channel access procedure initiation time point of the communication device is fixed (FBE) (hereafter, a frame-based channel access procedure or an FBE-based channel access procedure) is described using FIG. 7.

FIG. 7 illustrates another example of a channel access procedure of an unlicensed band in a wireless communication system according to various embodiments of the present disclosure.

The communication device which performs the frame-based channel access procedure may periodically transmit or receive a signal according to a fixed frame period (FFP). Herein, the FFP 700 may be declared or configured by the communication device (e.g., the base station), and the FFP may be configured from 1 ms to 10 ms. At this time, the channel access procedure (or clear channel access (CCA)) for the unlicensed band may be performed immediately before each frame period initiation 730, 733, and 736, and the channel access procedure may be performed for a fixed time as in the above-described Type 2 channel access procedure or for one observation slot. If determining that the unlicensed band is in the idle state or is an idle channel as a result of the channel access procedure, the communication device may transmit or receive a signal for up to 95% of time (hereafter, COT 710) of the FFP 700 without conducting a separate channel access procedure. In this case, at least 5% of the time of the FFP 700 is an idle time 720, where a signal may not be transmitted or received, and the channel access procedure may be performed within the idle time 720.

The frame-based channel access procedure is advantageous in that the method for performing the channel access procedure is relatively simpler than a traffic-based channel access procedure, and the channel access of the unlicensed band may be periodically performed. However, since the channel access procedure initiation time point is fixed, a probability of accessing the unlicensed band may be lower than the traffic-based channel access procedure.

Considering various services and requirements, the 5G system needs to flexibly define the frame structure. For example, each service may have a different SCS according to its requirement. The current 5G communication system supports a plurality of SCSs, and the SCS may be determined from [Equation 1].

$$\Delta f = f_0 \cdot 2^m \qquad \text{[Equation 1]}$$

In [Equation 1], $f_0$ denotes a default SCS of the system, m denotes a scaling factor which is an integer, and $\Delta f$ denotes the SCS. For example, if $f_0$ is 15 kHz, a SCS set available for the 5G communication system may include one of 3.75 kHz, 7.5 kHz, 15 kHz, 30 kHz, 60 kHz, 120 kHz, 240 kHz, and 480 kHz. The For example, the available SCS set may vary according to the frequency band. For example, 3.75 kHz, 7.5 kHz, 15 kHz, 30 kHz, and 60 kHz may be used in the frequency band below 6 GHz, and 60 kHz, 120 kHz, and 240 kHz may be used in the frequency band over 6 GHz.

In various embodiments, a corresponding OFDM symbol length may differ according to the SCS of the OFDM symbol. This is because, as characteristics of the OFDM symbol, the SCS and the OFDM symbol length have an inverse relationship. For example, if the SCS increases by two times, the symbol length is shortened by half, and inversely, if the SCS decreases by half, the symbol length is lengthened by two times.

Figure 8:
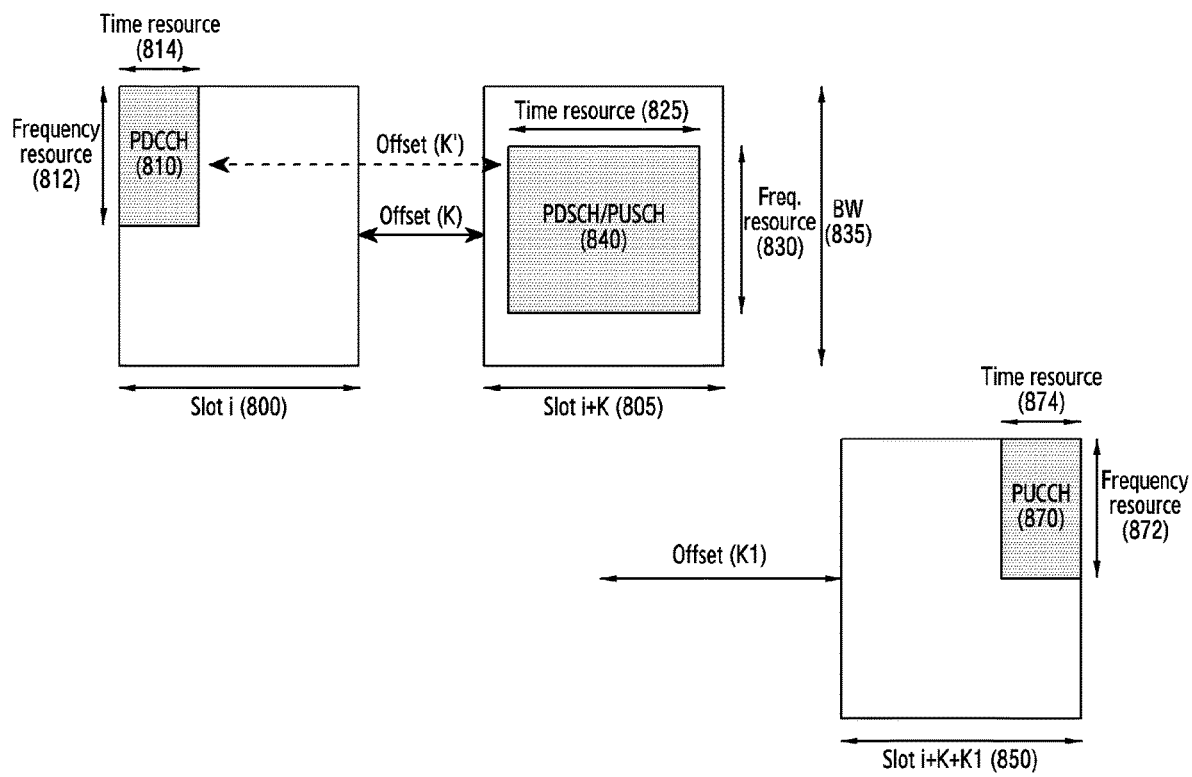
FIG. 8 illustrates an example of scheduling and feedback in a wireless communication system according to various embodiments of the present disclosure.

FIG. 8 illustrates an example of scheduling and feedback in a wireless communication system according to various embodiments of the present disclosure. The base station may transmit control information including DL and/or UL scheduling to the terminal. The base station may transmit DL data to the terminal. The terminal may transmit to the base station HARQ-ACK information, which is feedback for the DL data. Alternatively, the terminal may transmit UL data to the base station. The base station represents the base station 110 of FIG. 1. The terminal represents the terminal 120 or the terminal 130 of FIG. 1.

Referring to FIG. 8, a resource region in which a data channel is transmitted in a 5G or NR communication system is illustrated. The terminal may monitor and/or search for a PDCCH 810 in a DL control channel (hereafter, a PDCCH) region (hereafter, a control resource set (CORESET) or a search space (SS)) configured from the base station through a higher signal. In so doing, the DL control channel region includes time domain 814 and frequency domain 812 information, the time domain 814 information may be configured on a symbol basis, and the frequency domain 812 information may be configured on an RB or RB group basis.

If the terminal detects the PDCCH 810 in a slot i 800, the terminal may obtain DCI transmitted through the detected PDCCH 810. Through the received DCI, the terminal may obtain scheduling information of a DL data channel or UL data channel 840. That is, the DCI may include resource region (or a PDSCH transmission region) information in which at least the terminal is to receive the DL data channel (hereafter, PDSCH) transmitted from the base station, or resource region information allocated to the terminal from the base station for UL data channel (PUSCH) transmission.

A case where the terminal is scheduled for the UL data channel (PUSCH) transmission is described below by way of example. The terminal receiving the DCI may obtain slot index or offset information K to receive the PUSCH through the DCI, and determine a PUSCH transmission slot index. For example, the terminal may determine through the received offset information K that it is scheduled to transmit the PUSCH in a slot i+K 805, based on the slot index i 800 receiving the PDCCH 810. In so doing, based on the CORESET receiving the PDCCH 810, the terminal may determine a PUSCH starting symbol or time in the slot i+K 805 or the slot i+K through the received offset information K.

In addition, the terminal may obtain information relating to the PUSCH transmission time-frequency resource region 840 of the PUSCH transmission slot 805 from the DCI. PUSCH transmission frequency resource region information 830 may include PRB or PRB group unit information. Meanwhile, The PUSCH transmission frequency resource region information 830 may be information relating to a region included in an initial UL bandwidth (BW) which is determined or configured by the terminal through the initial access procedure, or an initial UL BW part (BWP). If the terminal is configured to receive the UL BW or the UL BWP through a higher signal, the PUSCH transmission frequency resource region information 830 may be information relating to the region included in the UL BW or the UL BWP configured through the higher signal.

In various embodiments, PUSCH transmission time resource region information 825 may be symbol or symbol group unit information, or information indicating absolute time information. The PUSCH transmission time resource region information 825 may be expressed as a combination of a PUSCH transmission starting time or symbol and a PUSCH length or a PUSCH ending time or symbol and included in the DCI as a single field or value. The terminal may transmit the PUSCH in the determined PUSCH transmission resource region 840 through the DCI.

In various embodiments, the terminal receiving the PDSCH 840 may report (feedback) to the base station a reception result (e.g., a HARQ-ACK/NACK) of the PDSCH 840. At this time, an UL control channel (PUCCH 870) transmission resource which transmits the reception result of the PDSCH 840 may be determined by the terminal based on a PDSCH-to-HARQ timing indicator and a PUCCH resource indicator which are indicated through the DCI 810 for scheduling the PDSCH 840. In other words, the terminal receiving the PDSCH-to-HARQ timing indicator K1 through the DCI 810 may transmit the PUCCH 870 in a slot i+K+K 850 after K1 from the PDSCH 840 reception slot 805. At this time, the PUCCH 870 transmission resource in the PUCCH transmission slot 850 may perform PUCCH transmission in the resource indicated through the PDCCH resource indicator of the DCI 810. In so doing, if a plurality of PUCCH transmissions is configured or indicated in the PUCCH transmission slot 850, the terminal may perform the PUCCH transmission in other PUCCH resource than the resource indicated by the PUCCH resource indicator of the DCI 810.

In the 5G communication system, to dynamically change the DL signal transmission and UL signal transmission periods in a time division duplex (TDD) system, whether each OFDM symbol constituting one slot is a DL symbol, a UL symbol, or a flexible symbol may be supported by a slot format indicator (SFI). Herein, a symbol indicated to be the flexible symbol may be neither the DL symbol nor the UL symbol, or may indicate a symbol which may be changed to a DL or UL symbol by terminal specific control information or scheduling information. In this case, the flexible symbol may include a gap guard required in switching the DL to the UL.

The SFI may be simultaneously transmitted to a plurality of terminals through a terminal group (or cell) common control channel. That is, the SFI may be transmitted through a PDCCH which is CRC-scrambled with a different identifier (e.g., an SFI-RNTI) from a terminal unique identifier (cell-RNTI (C-RNTI)). In various embodiments, the SFI may include information of N-ary slots, and the value N may be an integer or a natural number greater than 0, or may be a value set by the base station to the terminal through a higher signal among a set of predefined possible values such as 1, 2, 5, 10, and 20. In addition, a size of the SFI information may be configured by the base station to the terminal through a higher signal. An example of the slot format indicated by the SFI is shown in [Table 3].

TABLE 3

| format | symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |

TABLE 3-continued

| format | symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | F | F | U | U | U | U |
| 51 | D | F | F | U | U | U | U | D | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In Table 3, D denotes the DL, U denotes the UL, and F denotes the flexible symbol. According to Table 3, the total number of the supportable slot formats is 256. In the current NR system, a maximum size of the SFI information bits is 128 bits, and the SFI information bits may be a value which may be configured by the base station to the terminal through a higher signal (e.g., dci-PayloadSize).

In various embodiments, the SFI information may include slot formats of a plurality of serving cells, and the slot format for each serving cell may be distinguished by a serving cell ID. In addition, a combination of SFIs (slot format combination) for one or slots for each serving cell may be included. For example, if the size of the SFI information bits is 3 bits and the SFI information includes a SFI of one serving cell, the 3-bit SFI information may configure eight SFIs or SFI combinations (hereafter, SFIs) in total, and the base station may indicate one SFI of the eight SFIs through a terminal group common DCI (hereinafter, SFI information).

In various embodiments, at least one SFI of the eight SFIs may include a SFI for a plurality of slots. For example, [Table 4] shows an example of the 3-bit SFI information configured in the slot format of [Table 3]. Five (slot format combination ID 0, 1, 2, 3, and 4) of the SFI information are the SFIs for one slot, and the remaining three are information of the SFI (slot format combination ID 5, 6, and 7) for four slots, which may be applied to four slots in sequence.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal may receive configuration information of the PDCCH for detecting the SFI information through a higher signal, and detect the SFI according the configuration. For example, the terminal may be configured to receive through the higher signal at least one of CORESET configuration for detecting the SFI information, search space configuration, RNTI information used to CRC-scramble DCI carrying the SFI information, and period and offset information of the search space.

Figure 9:
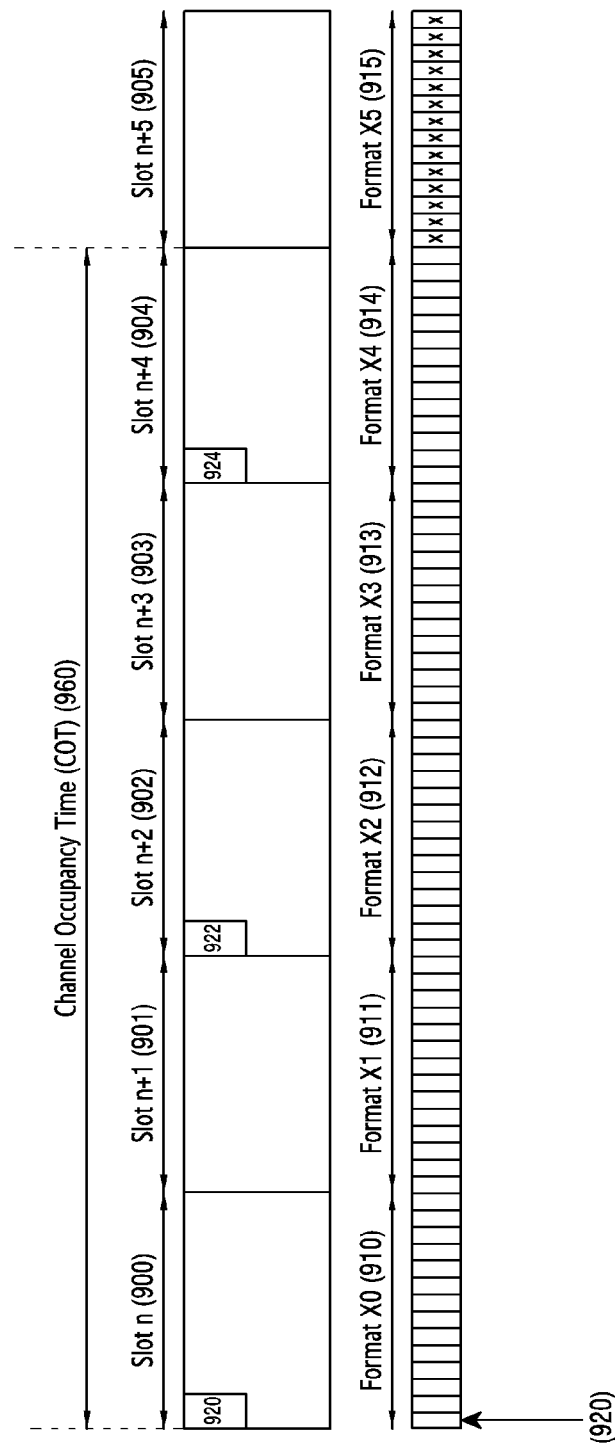
FIG. 9 illustrates a channel occupancy time in a wireless communication system according to various embodiments of the present disclosure.

FIG. 9 illustrates a COT in a wireless communication system according to various embodiments of the present disclosure.

Referring to FIG. 9, a case where the terminal should detect SFI information in PDCCH regions 920, 922, and 924, and a period of the PDCCH region is 2 slots is depicted. In other words, the terminal may detect DCI which is CRC-scrambled by a SFI identifier (e.g., an SFI-RNTI or a new RNTI) in the PDCCH regions 920, 922, and 924 (or CORESET) in slots n 900, n+2 902, and n+4 904, according to the configured PDCCH region and its period, and obtain the SFI of two slots through the detected DCI. At this time, the detected DCI may include SFI information of two or more slots, and how many slots of which the SFI is to be included in the DCI may be configured through a higher signal. The configuration information related to how many slots of which the SFI is to be included in the DCI may be included in the same higher signal as the higher signal which configures the SFI information. For example, referring to FIG. 9, the terminal may obtain SFI information 910 and 911 of a slot n 900 and a slot n+1 901 in the PDCCH region 920 of the slot n 900. At this time, the SFI information 910, 911, 912, 913, and 914 may have at least one value of the formats of [Table 3]. In this case, it may also have a new format other than the formats of Table 3.

If the base station transmits the SFI information in the unlicensed band, particularly, if the SFI information includes a SFI for a plurality of slots, the base station may not determine the SFI information for at least one or more slots, according to whether the channel is accessed in the unlicensed band. If the base station transmits the SFI information 914 and 915 for the slot n+4 904 and a slot n+5 905 in the PDCCH 924, it is necessary to determine how to indicate the SFI information of the slot n+5 905. For example, the base station may indicate that the SFI for other time than the COT is flexible.

In 7.125 GHz frequency band considered by the 5G communication system or a lower frequency band, one carrier may use up to 100 MHz frequency band. One carrier may use up to 400 MHz frequency band in a frequency band exceeding 7.125 GHz or the mmWave frequency band. In this case, the terminal may communicate with the base station using some frequency band (hereafter, a BWP) of the frequency band of the carrier, and the BWP may be configured by the base station through a higher layer signal. The base station and the terminal communicating using the unlicensed band perform the channel access procedure for the unlicensed band before transmitting a signal through the unlicensed band. At this time, in the unlicensed band near 5 GHz, the unlicensed band may be divided into channels by 20 MHz, and various communication devices may perform the channel access procedure for each channel divided by 20 MHz and perform communication using the unlicensed band. Accordingly, in the 5G communication system which may use the broadband, if the communication device is to perform the communication through the unlicensed band, it is advantageous that the communication device perform the channel access procedure by 20 MHz.

In the following, various embodiments of the present disclosure describe methods for determining (i.e., increase, decrease, change, or maintain) the contention window size, to perform the channel access procedure in the unlicensed band. According to various embodiments, to specify a DL signal considered to determine the contention window size, at least one of a slot, a DL data channel, a code block group (CBG), or a DL control channel may be determined as a reference.

Figure 10:
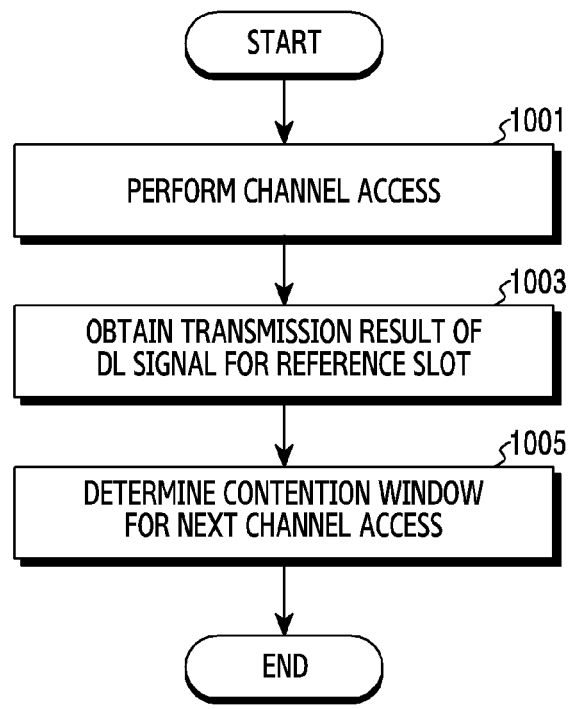
FIG. 10 illustrates a flowchart of a base station for channel access in a wireless communication system according to various embodiments of the present disclosure.

FIG. 10 is a flowchart of a base station for channel access in a wireless communication system according to various embodiments of the present disclosure. The base station exemplifies the base station 110 of FIG. 1.

Referring to FIG. 10, the base station performs channel access in step 1001. The base station may perform a channel access procedure to use an unlicensed band. The base station may perform channel sensing, to determine whether other node is using a channel of the unlicensed band. That is, the base station may perform the LBT. The base station may determine whether traffic for the channel occupancy of the other node in the unlicensed band is detected over a threshold. If not detecting the traffic below the threshold for a specific period, the base station may determine that the channel is empty. The empty channel state may be referred to as the idle state. If determining that the unlicensed band is in the idle state, the base station may occupy the channel for a specific time. The base station may transmit a DL signal to the terminal for a specific time. The DL signal may be a DL control signal or may include DL data. If determining that the unlicensed band is not in the idle state, the base station may continue the channel access procedure in step 1001.

In step 1003, the base station may obtain a transmission result of a DL signal for a reference slot. The reference slot may be a slot in which the DL signal is transmitted. The DL signal may be a DL signal for providing required HARQ-ACK information if the parameter Z used for the contention window adjustment is calculated. Herein, the slot may be a time domain unit of which the length is defined according to the SCS configuration. For example, the slot may be 1 ms. For another example, the slot may be 0.5 ms. According to various embodiments, the DL signal may be a signal transmitted in a first slot of the most recent DL transmission including a DL data channel or a DL control channel before a next channel access procedure (e.g., a channel access procedure after step 1001).

To occupy the channel through the next channel access procedure, channel sensing is required. Herein, a period in which the channel sensing is performed may be determined based on the contention window size. If transmissions of the base station and other node are simultaneously conducted in the same time resource, their collision probability may increase, and such a collision may cause signal transmission failure and accordingly it may be advantageous to reflect this collision situation in the channel sensing. Hence, the base station may determine the contention window size, by considering whether it collides with other device during a previous COT.

Specifically, for example, to occupy the unlicensed band, not only the base station but also other node may perform the channel access procedure. Since a signal of the other node over a threshold is not detected while the base station performs the channel sensing, the base station may determine that the channel by the other node is in the idle state during the channel sensing within the contention window. If the other node performs the channel access procedure after the DL transmission of the base station, the other node may detect that the current channel is busy due to the DL transmission of the base station. However, since the other node may not detect that the current channel is busy until the base station performs the DL transmission, it may be highly likely that the transmission of the base station collides with the transmission of the other node in a first time period (e.g., a starting slot) after the DL transmission initiation of the base station. For example, the time at which the base station initiates the channel occupancy, that is, the starting part (e.g., a starting slot or a starting subframe) of the COT by the DL transmission may be a period in which the other node also performs the channel access procedure and then initiates the channel occupancy. Since the other node does not identify the channel occupancy of the base station during the channel access procedure, it may transmit a signal in the period in which the DL transmission of the base station is initiated, and thus a collision between the transmissions may occur. Hence, the base station according to various embodiments of the present disclosure may determine a reference slot of the contention window, by considering the high probability of the transmission collision between the nodes immediately after the DL transmission is initiated.

The reference slot may be a slot in which a signal determined for the contention window adjustment is transmitted. The base station may determine the reference slot in various manners. According to various embodiments, the base station may determine the very first slot in the DL transmission, that is, the starting slot as the reference slot. The DL transmission may be the DL transmission most recently occupied by the base station before channel access of step 1005 to be described. The DL transmission may include transmission in at least one of a control channel (e.g., a PDCCH) or a data channel (e.g., a PDSCH). In addition, according to various embodiments, the base station may determine a slot in which the data channel starts first in the DL transmission as the reference slot. The DL transmission may be the most recent transmission including a DL data channel among DL transmissions before the channel access of step 1005 described below. In addition, according to various embodiments, the base station may determine a slot in which the control channel starts first during the DL transmission as the reference slot. The DL transmission may be the most recent transmission including the DL control channel among the DL transmissions before the channel access of step 1005 described below.

According to various embodiments, the reference slot may include not only the starting slot and but also a slot after the starting slot. In some embodiments, the base station may determine a starting slot n and its next slot n+1 of the most recent DL transmission as the reference slot. For example, if a DL signal (e.g., a PDSCH) is transmitted from an intermediate slot rather than a first symbol of the starting slot n, the base station may determine the starting slot and the next slot as the reference slot. The base station may determine three or more slots as well as two slots as the reference slot in the same manner.

The base station may transmit a DL signal. The base station may transmit the DL signal within a COT by the channel access procedure (or the previous channel access procedure) of step 1001. In response to the transmission of the DL signal transmitted by the base station, the terminal may transmit a UL signal to the base station. The base station may receive the UL signal. The UL signal may explicitly include a transmission result of the base station, or may implicitly indicate the transmission result of the base station.

The base station may obtain the transmission result of the DL signal, from the UL signal. The transmission result may include an ACK indicating successful reception of the DL signal or a NACK (or a DTX as necessary) indicating transmission failure of the DL signal. According to various embodiments, the base station may obtain the transmission result of at least one of a reference data channel or a reference control channel on the reference slot. Herein, the transmission result may be referred to as various terms such as a reception state, a reception result, a decoding result, and HARQ-ACK information of the DL signal. The transmission result may include at least one of the ACK indicating that the terminal successfully receives and decodes the DL signal, the NACK indicating that the terminal fails in decoding the DL signal, or DTX. According to an embodiment, the base station may obtain the transmission result, by considering at least one CBG of the reference data channel. Specific operations of an embodiment for obtaining the transmission result by considering the CBG are described in FIG. 11B.

In step 1005, the base station determines a contention window for a next channel access. The base station may determine the contention window, based on the transmission result of the DL signal of the reference slot. The base station may determine a size of the contention window, based on at least one of data channel(s), CBG(s) or control channel(s) included in the transmission result. Determining the contention window may include increasing, decreasing, changing, or maintaining the contention window. Hereafter, the procedure for increasing, decreasing, changing, or maintaining the contention window may be referred to as contention window adjustment in the present disclosure. That is, to reduce a collision probability between the base station and other node, the contention window adjustment may include a procedure of increasing the contention window at the base station (e.g., setting to a double size), a procedure of decreasing the contention window size (e.g., setting to a minimum value) at the base station by determining no collision with other node, a procedure of, if the current contention window size is a maximum value and thus may not further be increased, maintaining it, or a procedure of maintaining the contention window size, if feedback of a DL signal transmitted in a reference slot of a previous COT (e.g., 2 ms) is not received.

According to various embodiments, the base station may increase the contention window size to be greater than the contention window size for the channel access of step 1001, based on the transmission result. For example, the base station may double the contention window size. In addition, for example, the base station may change the contention window size to a value corresponding to a next size among predefined values. Meanwhile, if the current contention window size is the maximum value, the base station may maintain the contention window. According to various embodiments, based on the transmission result, the base station may decrease the contention window size to be smaller than the contention window size for the channel access of step 1001. For example, the base station may reduce the contention window size to the minimum value.

Although not depicted in FIG. 10, the base station may perform a next channel access procedure. The base station may determine a sensing period, based on the contention window determined in step 1005. For example, if the determined size of the contention window is 31, the base station may select N within a range of [0, 31] and determine the defer duration and the sensing period corresponding to N. After performing the next channel access procedure, the base station may perform DL transmission through the unlicensed band. The base station may perform the contention window adjustment procedure, by repeating step 1001 through step 1005.

Figure 11A:
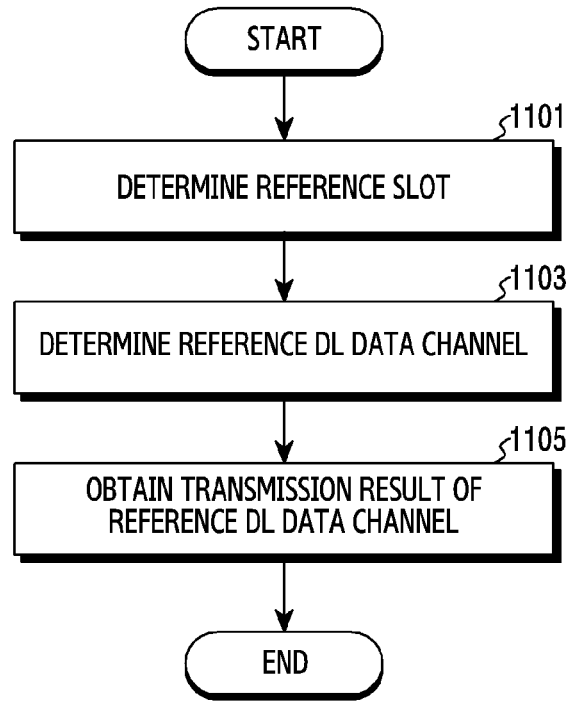
FIG. 11A illustrates a flowchart of a base station for contention window adjustment based on a downlink data channel in a wireless communication system according to various embodiments of the present disclosure.
Figure 11B:
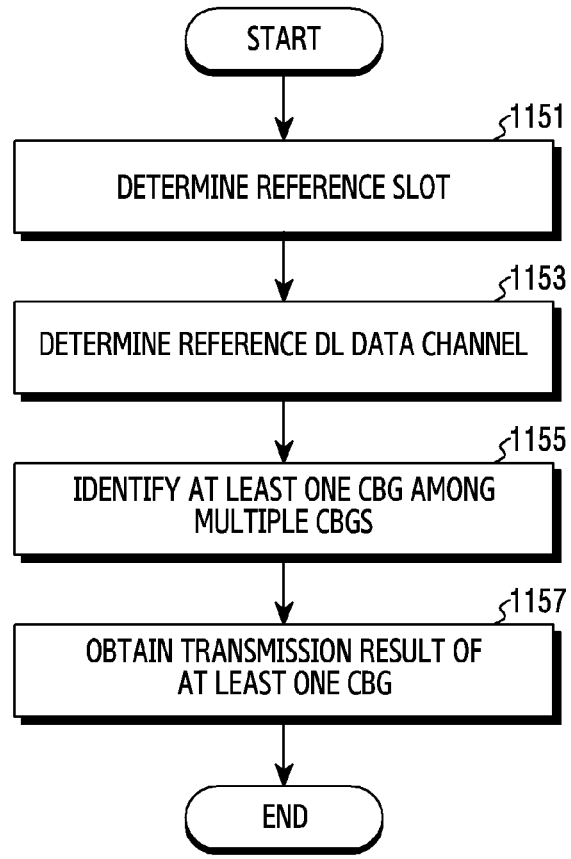
FIG. 11B illustrates a flowchart of the base station for contention window adjustment based on a code block group (CBG) in the wireless communication system according to various embodiments of the present disclosure.
Figure 12:
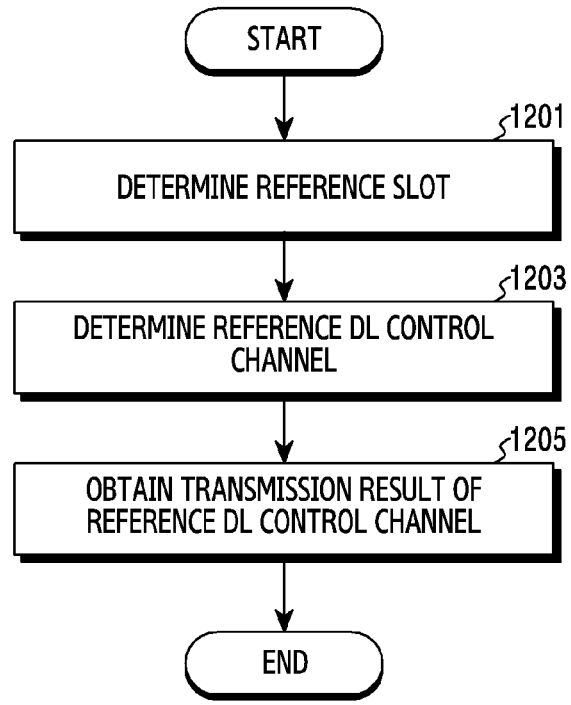
FIG. 12 illustrates a flowchart of a base station for contention window adjustment based on a downlink control channel in a wireless communication system according to various embodiments of the present disclosure.

Hereafter, various embodiments for determining a contention window by considering a transmission result of a DL data channel or a DL control channel, to occupy an unlicensed band, are described in FIG. 11A through FIG. 12.

FIG. 11A illustrates a flowchart of a base station for contention window adjustment based on a DL data channel in a wireless communication system according to various embodiments of the present disclosure. The base station illustrates the base station 110 of FIG. 1. FIG. 11A is part of step 1003 of FIG. 10, and the flowchart of FIG. 11A may be understood as the base station or the component of the base station.

Referring to FIG. 11A, the base station determines a reference slot, in step 1101. According to various embodiments, the base station may determine the reference slot for performing a current channel access procedure. The reference slot may be included in a COT obtained by a channel access procedure before the current channel access procedure. In some embodiments, the base station may determine a first slot (hereafter, a starting slot) of the most recent DL transmission, before the current channel access procedure, as the reference slot. DL transmission may include at least one of a control channel including DCI or data according to a DL scheduling result. Also, in some embodiments, the base station may determine a slot in which a first starting DL control channel is positioned, in the most recent DL transmission including the DL control channel, as the reference slot. Also, in some embodiments, the base station may determine a slot in which a first starting DL data channel is positioned in the most recent DL transmission including the DL data channel, as the reference slot.

In step 1103, the base station may determine a reference DL data channel. The reference DL data channel may be a data channel related to the reference slot. Herein, the data channel may indicate a channel carrying DL traffic, e.g., a PDSCH. The reference slot may include a plurality of symbols. In some embodiments, the base station may determine all DL data channels included in the reference slot as a reference DL data channel. In some other embodiments, the base station may determine the DL data channel transmitted first at each terminal among the DL data channels included in the reference slot as the reference DL data channel. In some other embodiments, the base station may determine a DL data channel initiated within specific symbols from a reference point as the reference DL data channel. For example, the reference point may be a starting time point of the reference slot. As another example, the reference point may be an ending time point of CORESET. In addition, as another example, the reference point may be set by the base station. The specific symbols may be predefined or set by the base station.

In step 1105, the base station may obtain a transmission result of the reference DL data channel. The transmission result indicates whether the terminal successfully receives and decodes the DL data transmitted through the reference DL data channel, or fails in decoding. The transmission result may be referred to as a reception result of the terminal. The transmission result may include an ACK or a NACK of the DL data. According to an embodiment, the base station may determine the transmission result of the DL data channel as a NACK, even though the reception result of the terminal, that is, feedback is not received from the terminal. In addition, according to an embodiment, if feedback according to channel selection is NACK/DTX or any state, the base station may determine the transmission result of the corresponding DL data channel as the NACK. Further, according to an embodiment, if a plurality of CWs is transmitted, the base station may independently obtain a transmission result of each CW as the transmission result of the DL data channel.

Although not depicted in FIG. 11A, hereafter, the base station may determine a contention window, based on the obtained transmission result. For example, if NACKs for the DL data channel are included over a threshold (e.g., Z=80%), the base station may increase a size of the contention window. If the current contention window size is a maximum value, the base station may maintain the contention window size. In addition, for example, if the NACKs for the DL data channel are not included over the threshold (e.g., Z=80%), the base station may set the contention window size to a minimum value.

FIG. 11B illustrates a flowchart of the base station for CBG-based contention window adjustment in the wireless communication system according to various embodiments of the present disclosure. The base station illustrates the base station 110 of FIG. 1. FIG. 11B is part of step 1003 of FIG. 10, and the flowchart of FIG. 11B may be understood as the base station or the component of the base station. According to an embodiment, step 1155 and step 1157 of FIG. 11B may be understood as part of step 1105 of FIG. 11A.

Referring to FIG. 11B, in step 1151, the base station may determine the reference slot. Determining the reference slot corresponds to step 1101 of FIG. 11A, and accordingly its redundant description may be omitted.

In step 1153, the base station may determine a reference DL data channel. Determining the reference DL data channel corresponds to step 1101 of FIG. 11A, and its redundant description may be omitted.

In step 1155, the base station may identify at least one CBG among a plurality of CBGs. The reference DL data channel may include a plurality of CBGs. The reference DL data channel may be related to a TB. The TB may include one or more CBGs. A CBG may include one or more code blocks. In the CBG-based transmission, the base station may include a CBG transmission information (CBGTI) field in DCI including scheduling for the DL data channel.

According to various embodiments, the base station may identify the CBG to be actually transmitted among the plurality of the CBGs. The CBG to be actually transmitted may be a CBG to be retransmitted, and may indicate code blocks actually retransmitted to the terminal.

According to various embodiments, the base station may identify at least one CBG, among the CBGs to be actually transmitted. In some embodiments, the base station may identify all of the CBG(s) actually transmitted. Also, in some embodiments, the base station may identify K-ary CBGs which are temporally earlier among the actually transmitted CBG(s). In addition, in some embodiments, the base station may identify K-ary CBGs, in ascending order of the index among the actually transmitted CBG(s). Further, in some embodiments, the base station may identify a CBG initiated within X symbols from the transmission starting time point.

In step 1157, the base station may obtain a transmission result of at least one CBG. The base station may obtain the transmission result of each CBG, based on HARQ-ACK information received from the terminal. The base station may obtain the transmission result of the actually transmitted CBG. The base station may obtain the transmission result of the at least one CBG identified in step 1155, from the transmission result of the actually transmitted CBG.

Although not depicted in FIG. 11B, hereafter, the base station may determine the contention window, based on the obtained transmission result. In some embodiments, the base station may determine the transmission result of the corresponding reference DL data channel, based on the transmission result of the at least one CBG. For example, if determining that Y % or more of at least one CBG are NACKs, the base station may determine that the DL data channel including the at least one CBG is NACK. The base station may determine the contention window, based on the transmission result of the DL data channel. In addition, in some embodiments, the base station may determine the contention window, based on a NACK ratio of the CBG(s) identified in respective DL data channels. For example, if all the reference DL data channels configured in the BWP correspond to the CBG-based transmission, the base station may increase the contention window size, if the NACK ratio of the actually transmitted CBGs among all the CBGs configured in the BWP is equal to or greater than Y %.

FIG. 12 illustrates a flowchart of a base station for contention window adjustment based on a DL control channel in a wireless communication system according to various embodiments of the present disclosure. The base station illustrates the base station 110 of FIG. 1. FIG. 12 is part of step 1003 of FIG. 10, and the flowchart of FIG. 12 may be understood as the base station or the component of the base station.

Referring to FIG. 12, in step 1201, the base station determines a reference slot. Determining the reference slot corresponds to step 1101 of FIG. 11A, and accordingly its redundant description may be omitted.

In step 1203, the base station determines a reference DL control channel. The reference DL control channel may indicate a control channel be related to the reference slot. Herein, the data channel may indicate a channel carrying DCI, for example, a PDCCH or a CORESET. In some embodiments, the base station may determine all of DL control channels included in the reference slots as the reference DL control channel. In some other embodiments, the base station may determine a DL control channel first transmitted to each terminal among the DL control channels included in the reference slot as the reference DL control channel. In some other embodiments, the base station may determine a DL control channel initiated within specific symbols from a reference point as the reference DL control channel.

According to various embodiments, the base station may determine a DL control channel for obtaining a reception result of the terminal as the reference DL control channel. In some embodiments, the base station may determine a DL control channel including DL semi-persistent scheduling (SPS) configuration information as the reference DL control channel. The configuration may include activation, deactivation, or release. In some other embodiments, the base station may determine a DL control channel including uplink SPS configuration information as the reference DL control channel. The configuration may include activation, deactivation, or release. In some other embodiments, the base station may determine a DL control channel including UL data scheduling information as the reference DL control channel.

According to various embodiments, the base station may determine one or more DL control channels, among the DL control channels for obtaining the reception result of the terminal, as the reference DL control channel. For example, the base station may determine the DL control channel which is the temporally earliest among the DL control channels for obtaining the reception result of the terminal as the reference DL control channel.

According to various embodiments, the base station may determine a DL control channel corresponding to UL signal transmission without LBT, as the reference DL control channel. For example, if a switching gap between the DL and the UL is 16 us or less, the base station may determine a DL control channel including UL data allocation information as the reference DL control channel. As another example, the base station may determine a DL control channel including DCI indicating to perform the channel access procedure without the LBT (e.g., LBT Category 1 of 3GPP) as the reference DL control channel.

In step 1205, the base station may obtain a transmission result of the reference DL control channel. The base station may obtain the transmission result from a response signal for the reference DL control channel.

In some other embodiments, the base station may explicitly obtain the transmission result of the reference DL control channel. The base station may obtain the transmission result of the reference DL control channel, through HARQ-ACK feedback for the reference DL control channel or a logical channel ID (LCID) of a MAC CE.

In some other embodiments, the base station may implicitly obtain the transmission result of the reference DL control channel. The base station may obtain the transmission result of the reference DL control channel, by receiving a UL data channel (e.g., a PUSCH) transmitted according to a UL grant included in the reference DL control channel. If failing in decoding the UL data channel, even though the UL grant is transmitted, the base station may obtain the transmission result of the reference DL control channel. Although not depicted in FIG. 12, hereafter, the base station may determine a contention window, based on the transmission result of the reference DL control channel.

While FIG. 12 describes based on the reference DL control channel, according to various embodiments, it is noted that the base station may determine the contention window by considering only the reference DL control channel, and also perform the contention window adjustment procedure by considering both of the reference DL control channel and the reference DL data channel. For example, the base station may increase, decrease, or maintain the size of the contention window, based on transmission results of all of at least one DL control channel and at least one DL data channel (hereafter, a reference DL channel, or a reference channel) initiated in a first symbol from the DL transmission starting time point.

Figure 13:
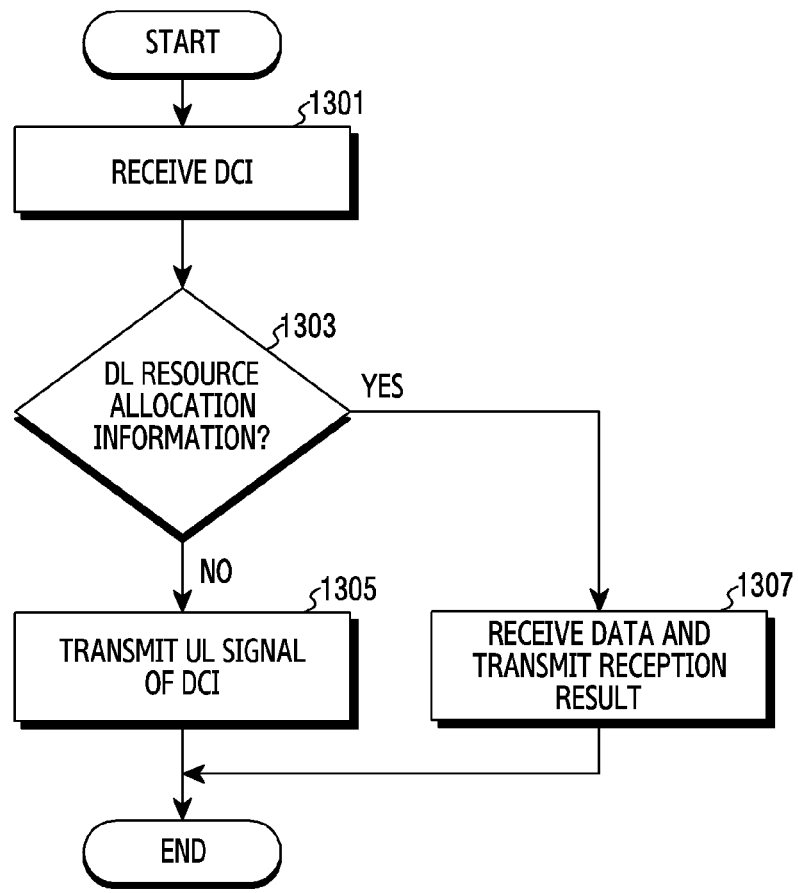
FIG. 13 illustrates a flowchart of a terminal for channel access in a wireless communication system according to various embodiments of the present disclosure.

FIG. 13 illustrates a flowchart of a terminal for a channel access procedure in a wireless communication system according to various embodiments of the present disclosure. The terminal illustrates the terminal 120 or 130 of FIG. 1.

Referring to FIG. 13, in step 1301, the terminal may receive DCI.

According to various embodiments, the terminal may identify whether the base station accesses a channel. In so doing, the terminal may identify whether the base station accesses the channel, by determining whether it receives a demodulation reference signal (DM-RS) transmitted with at least one or more channels of a DL control channel or a DL data channel transmitted by the base station. As another method for the terminal to identify whether the base station accesses the channel, the terminal may determine whether DCI transmitted from the base station through the DL control channel is received. As yet another method for the terminal to identify whether the base station accesses the channel, the terminal may determine whether the base station accesses the channel by receiving a predefined signal with the terminal as a signal transmitted by the base station in starting DL signal, for example, an initial signal (or a reservation signal).

According to various embodiments, the DCI may be DCI which requires to perform the feed on the DCI of the terminal. In some embodiments, the DCI may include DL SPS configuration. The DCI may indicate activation, deactivation, or release of the DL SPS. The terminal may be required to provide feedback (e.g., HARQ-ACK) to indicate completion of the DL SPS configuration. In addition, in some embodiments, the DCI may include UL SPS configuration. The DCI may indicate activation, deactivation, or release of the UL SPS. The terminal may be required to provide feedback (e.g., a MAC CE) to indicate completion of the UL SPS configuration. Also, according to various embodiments, the DCI may receive DCI including scheduling of DL data and DCI including scheduling of uplink data.

In step 1303, the terminal may determine whether the DCI includes DL resource allocation information. If the DCI does not include the DL resource allocation information, the terminal may perform step 1305. If the DCI includes the DL resource allocation information, the terminal may perform step 1307.

In step 1305, the terminal may transmit a UL signal relating to the DCI. In some embodiments, the UL signal of the DCI may be HARQ-ACK information of the DCI. The HARQ-ACK information may include an ACK or a NACK. In some other embodiments, the UL signal of the DCI may be a MAC CE. For example, the MAC CE of the UL signal may indicate configurated grant confirmation. In some other embodiments, the UL signal of the DCI may include UL data according to the UL scheduling included in the DCI.

In step 1307, the terminal may receive data from the base station, and transmit a reception result to the base station. The terminal may receive DL data from the base station, based on the DL resource allocation information. The terminal may successfully receive the DL data, and decode the received data. If the decoding is successful, the terminal may generate HARQ-ACK information including an ACK. If the decoding fails, the terminal may generate HARQ-ACK information including a NACK. The terminal may transmit the reception result including the HARQ-ACK information to the terminal.

In FIG. 10 through FIG. 13, the operations of the base station and the terminal for adjusting the contention window based on at least one of the reference slot, the reference data channel, the reference CBG, or the reference control channel have been described. Now, various embodiments for adjusting the contention window are described through the resource region, in FIG. 14 through FIG. 15.

Figure 14:
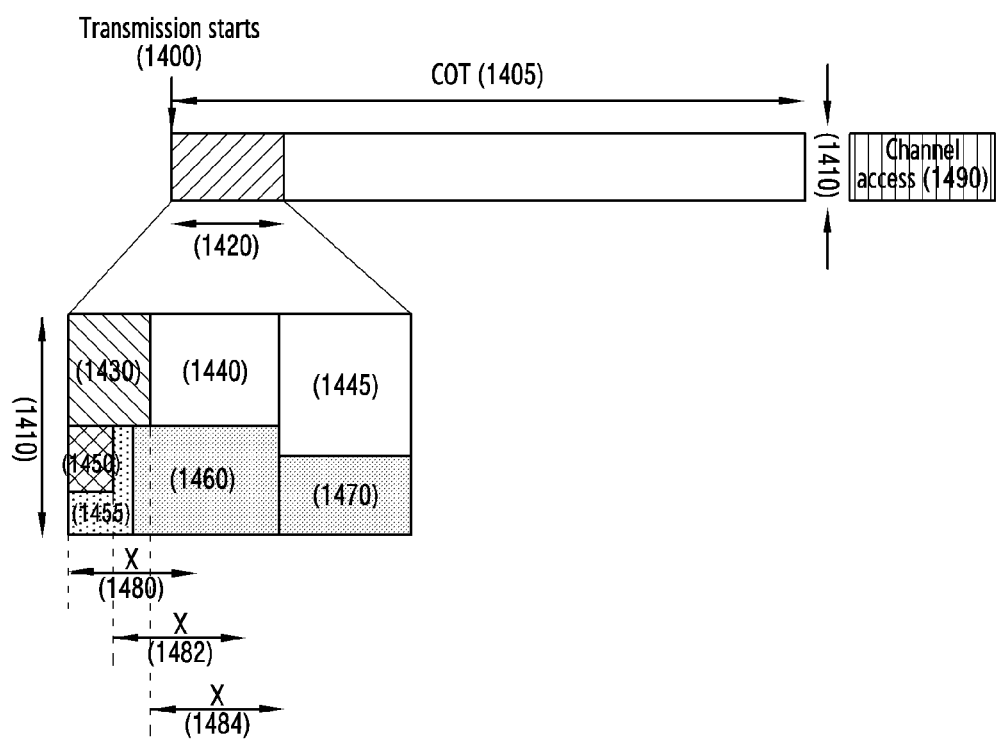
FIG. 14 illustrates an example of a channel access procedure in a wireless communication system according to various embodiments of the present disclosure.

FIG. 14 illustrates an example of a channel access procedure in a wireless communication system according to various embodiments of the present disclosure. Referring to FIG. 14, the base station may perform the channel access procedure to communicate with the terminal using a BWP 1410 of a carrier. If the BWP 1410 is greater than 200 MHz, the base station may divide the BWP into one or more subbands, and perform the channel access procedure for each subband. In so doing, a subband size (or the number of PRBs) forming in the BWP 1410, start/end frequency domain information, and so on may vary depending on a bandwidth of the BWP 1410 and the SCS.

The base station may determine that the channel is idle by performing the channel access procedure. The base station may occupy and use the channel for a time 1404 within an MCOT defined according to a channel access priority class used for the channel access procedure. In so doing, similarly to FIG. 6, the base station may define one or more slots starting the COT as a reference slot 1420, and change a size of the contention window based on a reception result of the terminal receiving a DL data channel transmitted in the reference slots. In the 5G communication system, one or more DL data channels may be transmitted to the terminal within the reference slot. For example, referring to FIG. 14, the base station may transmit PDSCHs 1440 and 1445 to a first terminal, transmit PDSCHs 1455 and 1470 to a second terminal, and transmit a PDSCH 1460 to a third terminal in the reference slot 1420. In addition, according to an embodiment, at least one terminal of the terminals may transmit the reception result of the DL data channel to the base station by the CBG.

Hereafter, according to various embodiments of the present disclosure, the reference slot for the contention window adjustment may be defined, if the base station and the terminal communicate using the unlicensed band. In addition, according to various embodiments, a method of the contention window adjustment of the base station is provided, if a plurality of DL data channels is transmitted to at least one terminal in the reference slot. In addition, according to various embodiments, a method of the contention window adjustment of the base station is proposed, if the terminal transmits data reception results distinguished per CBG for at least one DL data channel in the reference slot. The base station may identify a CBG corresponding to the reception result determined for the contention window change. Further, according to various embodiments, a method of the contention window adjustment of the base station using not only a DL data channel but also a DL control channel in the reference slot is proposed. The base station may determine a reference control channel considered for the contention window adjustment.

[Embodiment 1] Data-Channel-Based Contention Window Adjustment

In the unlicensed band, the base station may adjust a contention window used in a channel access procedure. The base station may determine the contention window based on a reception result of the terminal for a DL data channel transmitted in a reference slot. Now, a method for determining (changing or maintaining) the contention window, if one or more DL data channels are transmitted to the terminal in the reference slot is described below.

The base station may perform the channel access procedure to transmit a DL signal in the unlicensed band. For example, as shown in FIG. 6, the channel access procedure may be performed in a manner having the contention window of a variable size. If determining that the unlicensed band is an idle channel, the base station may initiate the channel occupancy 1400 as shown in FIG. 14. The base station may occupy the channel during an MCOT or a shorter time 1404 defined according to a channel access priority class used for the channel access procedure. In so doing, according to an embodiment, the base station may determine a first slot of the COT 1404 (or a starting slot of the COT) as the reference slot 1420. The base station may determine the contention window for a next channel access procedure 1490 based on the reception result of the terminal for the DL data channel transmitted to the terminal in the reference slot 1420, that is, the transmission result of the DL data channel. Determining the contention window may indicate determining the size of the contention window which is the basis of the sensing period (e.g., N-ary slots) for determining channel occupancy by other node. Determining the contention window may include maintaining or changing (increasing or decreasing (e.g., initializing)) the contention window size. For example, if a ratio of NACKs in the reception results of the DL data channels transmitted to the terminals in the reference slot 1420 is equal to or greater than Z % (e.g., Z=80%), the base station may increase the contention window to a next size of the contention window. If the ratio of the NACKs in the reception results is smaller than Z %, the base station may change the contention window to a contention window initial value or the contention window having the smallest size among the contention window sizes. In so doing, the contention window change may be determined based on the transmission result of the DL data channel received from the terminal before the base station initiates the channel access procedure 1490. If the base station indicates the terminal to transmit the transmission result of the DL data channel in the reference slot before the channel access procedure 1490 is initiated but the base station does not receive the transmission result from the terminal, the base station may determine or assume that the transmission result of the terminal for the DL data channel is the NACK, and change the contention window. As such, determining or assuming that the reception result of the DL data channel not received before the base station initiates the channel access procedure is the NACK is only an example, and the embodiments of the present disclosure are not limited thereto.

The base station may transmit DL data channels to one or more terminals in the reference slot. In so doing, the base station may transmit a plurality of DL data channels to a specific terminal in the reference slot 1420. The plurality of the DL data channels may be distinguished and transmitted in time or frequency. For example, the base station may transmit DL data channels 1440, 1445, 1455, 1460, and 1470 to one or more terminals in the reference slot 1420. More specifically, the base station may transmit the DL data channels 1440 and 1445 to a terminal (a first terminal), transmit the DL data channels 1455 and 1470 to another terminal (a second terminal), and transmit the DL data channel 1460 to yet another terminal (a third terminal). If the DL data channel is transmitted to one or more terminals and one or more DL data channels are transmitted to one or more terminals in the reference slot, the base station may determine the contention window through the following methods.

Method 1-1: determine all the DL data channels transmitted in the reference slot as the reference DL data channel, and determine the contention window based on the reception result of the terminal for the reference DL data channels.

Method 1-2: determine a DL data channel transmitted first (or earliest) for each terminal among all the DL data channels transmitted in the reference slot as the reference DL data channel, and determine the contention window based on the reception result of the terminal for the reference DL data channel.

Method 1-3: determine a DL data channel in which transmission of the DL data channel starts within X symbols after the channel access initiation of the base station, among all the DL data channels transmitted in the reference slot as the reference DL data channel, and determine the contention window based on the reception result of the terminal for the reference DL data channel.

Method 1-1 is described in more detail with FIG. 14.

According to Method 1-1, the base station may determine all the DL data channels 1440, 1445, 1455, 1460, and 1470 which initiate the transmission in the reference slot 1420 as the reference DL data channel. The base station may change the contention window by using the reception result of the terminal for the reference DL data channels. The reference slot including the DL data channel which is first transmitted after the base station initiates the channel access has a high collision probability with other devices in the unlicensed band channel. Hence, the base station may change the contention window based on all the DL data channels transmitted in the reference slot. In this case, the reference data channel used for the contention window adjustment may be any DL data channel transmitted in the reference slot.

Method 1-2 is described in more detail with FIG. 14.

According to Method 1-2, the base station may determine the DL data channel which initiates the transmission for each terminal first (or earliest) among all the DL data channels 1440, 1445, 1455, 1460, and 1470 which initiate the transmission in the reference slot 1420 as the reference DL data channel. The base station may change the contention window size using the reception result of the terminal for the reference DL data channel. The base station may transmit the DL data channels 1440 and 1445 to a terminal (the first terminal), transmit the DL data channels 1455 and 1470 to another terminal (the second terminal), and transmit the DL data channel 1460 to yet another terminal (the third terminal) in the reference slot 1420. At this time, since the DL data channel which initiates the transmission of each terminal first (earliest) is the reference DL data channel, a data channel 1040 of the first terminal, a data channel 1055 of the second terminal, and 1060 of the third terminal may be determined as the reference DL data channels respectively. The base station may determine to change the contention window using the reception result of the terminal for the reference DL data channel.

The DL data channel which is transmitted first after the base station initiates the channel access has the high collision probability with other devices in the unlicensed band channel. Thus, the base station may change the contention window based on the DL data channel which first initiates the transmission of the unlicensed band to each terminal, among all the DL data channels transmitted in the reference slot.

The contention window may be changed more efficiently, by considering the DL data channel having the highest collision probability with other devices in the unlicensed band channel in comparison with Method 1-1. The reference data channel used for the contention window adjustment may be the first DL data channel of each terminal transmitted in the reference slot.

Method 1-3 is described in more detail with FIG. 14.

According to Method 1-3, the base station may determine the DL data channel of which transmission starts within X symbols 1480 after the channel access initiation 1400 of the base station, among all the DL data channels 1440, 1445, 1455, 1460, and 1470 which initiate the transmission in the reference slot 1420, as the reference DL data channel. The base station may change the contention window based on the reception result of the terminal for the reference DL data channel. At this time, in some embodiments, X may be predefined between the base station and the terminal. For example, X may be 1. In addition, in some embodiments, X may be set in the terminal by the base station through a higher signal. For example, X may be set to one of 1 or 2 through RRC signaling. Further, in some embodiments, X may be predefined according to the channel access priority class of the base station. For example, as the MCOT of the base station is longer, that is, as the channel access priority class p is greater, X may be defined to be greater. As the MCOT is longer, the base station may determine more DL data channels as the reference DL data channel.

Method 1-3 is described in more detail as follows. For example, if X is 1, the DL data channel which initiates the transmission in the first symbol among all the DL data channels 1440, 1445, 1455, 1460, and 1470 which initiate the transmission in the reference slot 1420 may be the reference DL data channel. At this time, the first symbol may be the first symbol of the reference slot 1420 or the first symbol of symbols carrying the DL data channel after the base station initiates the channel occupancy. Also, according to another embodiment, it may be a first symbol transmitting the DL control channel after the base station initiates the channel occupancy. In other words, if X=1 is the first symbol for transmitting the DL data channel after the base station initiates the channel occupancy, the DL data channel 1455 among all the DL data channels 1440, 1445, 1455, 1460, and 1470 which initiate the transmission in the reference slot 1420 is the reference DL data channel. As another example, if X is 3, it is assumed that the DL data channels 1440 and 1445 among all the DL data channels 1440, 1445, 1455, 1460, and 1470 which initiate the transmission in the reference slot 1420 initiate transmission within X=3 symbols. At this time, if the reference DL data channel is the DL data channel which initiates the DL data channel transmission within X symbols after the channel access initiation 1400 of the base station, that is, X=3, the base station may determine 1440 of the first terminal and DL 1455 of the second terminal as the reference DL data channel according to Method 1-3. The base station may determine the contention window change using the reception result of the terminal for the reference DL data channels. In so doing, if a plurality of DL data channels is determined to the reference DL data channel at a specific terminal, the base station may determine the first (or transmitted earliest) DL data channel, among the reference DL data channels of the terminal as the reference DL data channel. For example, if the DL data channels 1440 and 1445 of the first terminal are determined as the reference DL data channel (X>3), the first (or transmitted earliest) DL data channel 1440 may be determined as the reference DL data channel. In other words, the base station may not include other DL data channel 1445 than the first (or transmitted earliest) DL data channel 1440, among the DL data channels included in the reference DL data channels of the first terminal, in the reference DL data channel.

Method 1-3 determines the DL data channel which starts the transmission within X symbols 1480 based on a slot boundary (e.g., a symbol index #0) of the reference slot 1420 or the starting time 1400 or symbol which initiates the signal transmission after the channel access of the base station as the reference DL data channel, but the present disclosure is not limited thereto. According to various embodiments, the base station may determine a DL data channel which starts transmission within the X symbols 1480 after the CORESET last symbol (hereafter, a reference symbol) of the reference slot 1420 as the reference DL data channel.

If a plurality of CORESETs is included in the reference slot, the base station may identify a CORESET for determining the reference symbol. In some embodiments, the base station may identify the CORESET having the shortest length among the plurality of the CORESETs. That is, the reference symbol may be the last symbol of the CORESET of the shortest CORESET length among the CORESETs configured in the reference slot 1420. For example, the base station may apply the last symbol of the CORESET 1450 having the shortest length, among the CORESETs 1430 and 1450 configured in the reference slot 1420, as the reference symbol 1482. By applying the last symbol of the CORESET having the shortest length as the reference symbol, there is an advantage of including the DL data channel 1455 transmitted earliest, after the base station initiates the channel occupancy, in the reference DL data channel. In some other embodiments, the base station may identify the longest CORESET among the plurality of the CORESETs. That is, the reference symbol may be the last symbol of the longest CORESET 1430, among the CORESETs 1430 and 1450 configured in the reference slot 1420. For example, the base station may apply the last symbol of the longest CORESET 1430, among the CORESETs 1430 and 1450 configured in the reference slot 1420, as the reference symbol 1484. By applying the last symbol of the longest as the reference symbol, there is an advantage of including the DL data channel transmitted through the entire transmission bandwidth of the transmitted DL data channel, after the channel occupancy initiation, in the reference DL data channel.

[Embodiment 2] CBG-Based-Based Contention Window Adjustment

In the unlicensed band, the base station may adjust the contention window used in the channel access procedure. The base station may determine a reference data channel among DL data channels transmitted in a reference slot (e.g., the embodiment 1). At this time, if receiving reception results of at least one or more reference DL data channels by CBG, the base station may determine the contention window based on the reception results of the CBGs. Now, a method for determining (changing or maintaining) the contention window if the transmission result of the DL signal is obtained by CBG is described below.

The base station may perform the channel access procedure for DL signal transmission in the unlicensed band. For example, as shown in FIG. 6, the channel access procedure may be performed in the manner having the contention window of the variable size. If determining that the unlicensed band is the idle channel, the base station may initiate the channel occupancy 1400 and occupy the channel during the MCOT defined according to the channel access priority class used in the channel access procedure or the shorter time 1404 as shown in FIG. 14. In so doing, according to an embodiment, the base station may determine the first slot of the COT 1405 (or the starting slot of the COT) as the reference slot 1420. The base station may determine the contention window for the next channel access procedure 1490 based on the reception result of the terminal for the DL data channel transmitted to the terminal in the reference slot 1420. Determining the contention window may indicate determining the size of the contention window which is the basis of the sensing period (e.g., N-ary slots) for determining channel occupancy by other node. Determining the contention window may maintain or change (increase or decrease (e.g., initialize)) the contention window size. For example, if the ratio of the NACKs in the reception results of the DL data channels transmitted to the terminals in the reference slot 1420 is equal to or greater than Z % (e.g., Z=80%), the base station may increase the contention window to the contention window having the next size. If the ratio of the NACKs in the reception results is smaller than Z %, the base station may change the contention window to the contention window having the contention window initial value or the smallest size among the contention window sizes. At this time, the contention window change may be determined based on the reception result of the DL data channel from the terminal before the base station initiates the channel access procedure 1490. If the base station indicates the terminal to transmit the transmission result of the DL data channel in the reference slot before the base station initiates the channel access procedure 1490 but the base station may not receive it, the base station may determine or assume that the DL data channel reception result of the terminal is the NACK, and perform the contention window change. As such, determining or assuming that the reception result of the DL data channel not received before the base station initiates the channel access procedure is the NACK is only an example, and the embodiments of the present disclosure are not limited thereto.

The base station may transmit the DL data channel to one or more terminals in the reference slot. In so doing, the base station may transmit a plurality of DL data channels to a specific terminal in the reference slot 1420. The plurality of the DL data channels may be distinguished and transmitted in time or frequency. For example, in FIG. 14, the base station may transmit the DL data channels 1440, 1445, 1455, 1460, and 1470 to one or more terminals in the reference slot 1420. More specifically, the base station may transmit the DL data channels 1440 and 1445 to a terminal (the first terminal), transmit the DL data channels 1455 and 1470 to another terminal (the second terminal), and transmit the DL data channel 1460 to yet another terminal (the third terminal).

If transmitting the DL data channel to one or more terminals and transmitting one or more DL data channels to one or more terminals in the reference slot, the base station may determine the reference DL data channel through at least one or more methods of the embodiment 1 of the present disclosure. The base station may determine the contention window through the reception result of the terminal for the reference DL data channel. Meanwhile, the base station may receive the reception result (i.e., the transmission result of the base station) of at least one or more reference DL data channels in the reference DL data channel by CBG. In so doing, by considering the CBG-based transmission result, the base station may determine an ACK/a NACK for the reference DL data channel, and thus change the contention window through the following methods.

Method 2-1: if Y % or more of the reception results for all the CBGs of the reference DL data channel are NACKs, determine that the reception result of the reference DL data channel is the NACK.

Method 2-2: if K-ary CBGs which are sequential from the beginning among the reception results for all the CBGs of the reference DL data channels (or K-ary CBGs in ascending order of the CBG index, among the CBGs transmitted in the reference slot) are NACKs, determine that the reception result of the reference DL data channel is the NACK.

Method 2-3: if Y % of the reception results for CBG(s) of which transmission is initiated within X symbols among the reception results for all the CBGs of the reference DL data channels are NACKs, determine that the reception result of the reference DL data channel is the NACK.

If receiving the reception result of at least one or more reference DL data channels of the reference DL data channels by CBG, the base station may determine the transmission result of the reference data channels, by considering the CB-based reception result. Hereinafter, the various methods for determining the transmission result of the reference DL data channels are described in more detail below in FIG. 15.

Figure 15:
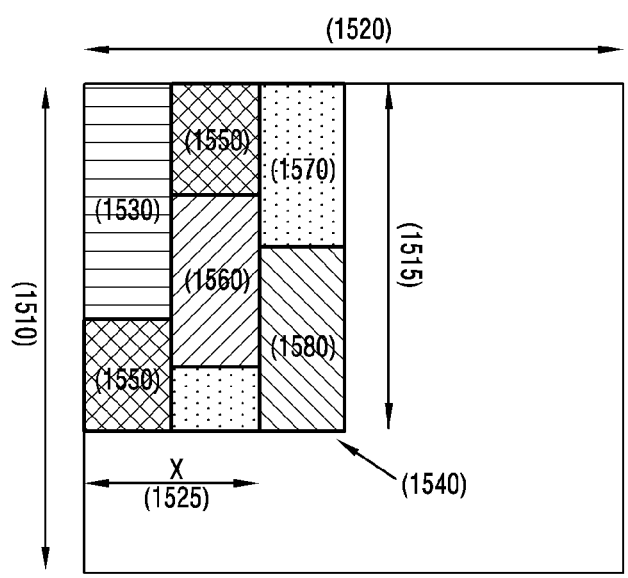
FIG. 15 illustrates an example of a CBG-based channel access procedure in a wireless communication system according to various embodiments of the present disclosure.

FIG. 15 illustrates an example of a CBG-based channel access procedure in a wireless communication system according to various embodiments of the present disclosure. FIG. 15 depicts a resource region 1500. A vertical axis is the frequency domain and indicates a BWP or carrier bandwidth 1510, and a horizontal axis is the time domain and indicates a reference slot 1520. At this time, the reference slot 1520 may be the reference slot 1520 determined using at least one or more methods of the embodiment 1 of the present disclosure. A resource region 1530 indicates a CORESET. The reference slot 1520 may include one 1540 of reference DL data channel(s). In this case, the terminal may transmit to the base station a reception result of the reference DL data channel 1540 by CBG 1550, 1560, 1563, 1566, 1570, and 1580. If the reception result for at least one code block of the code blocks belonging to the CBG is a NACK, the reception result of the CBG is a NACK.

Method 2-1: if Y % or more of the reception results for all the CBGs of the reference DL data channel are NACKs, determine that the reception result of the reference DL data channel is the NACK.

Method 2-1 is described more specifically in FIG. 15.

The base station may receive the CBG-based reception result of the reference DL data channel 1540 from the terminal. At this time, if Y % or more of the reception results for all the CBGs 1550, 1560, 1570, and 1580 actually transmitted in the reference slot 1520 among the CBG-based reception result received from the terminal are NACKs, the base station may determine that the reception result of the reference DL data channel 1540 is the NACK. At this time, if Y=100% and the reception results 1550, 1560, 1570, and 1580 for all the CBGs actually transmitted in the reference slot 1520 among the CBG-based reception result received from the terminal are NACKs, the base station may determine that the reception result of the reference DL data channel 1540 is the NACK. In other words, if the reception result for at least one CBG among the reception results for all the CBGs 1550, 1560, 1570, and 1580 actually transmitted in the reference slot 1520 in the CBG-based reception result received from the terminal is an ACK, the base station may determine that the reception result of the reference DL data channel 1540 is an ACK.

Method 2-2: if K-ary CBGs in sequence from the beginning among the reception results of all the CBGs of the reference DL data channels (or K-ary CBGs in ascending order of the CBG index, among CBGs transmitted in the reference slot) are NACKs, determine that the reception result of the reference DL data channel is a NACK.

Method 2-2 is described more specifically in FIG. 15.

The base station may receive the CBG-based reception result of the reference DL data channel 1540 from the terminal. In so doing, the base station may determine an ACK/NACK of the reference data channel, based on the reception results of the K-ary CBG(s) among the reception results of the terminal for the CBGs of the reference DL data channel 1540 actually transmitted to the terminal in the reference slot 1520. The base station may identify at least one code block (K-ary CBGs) among a plurality of CBGs. According to an embodiment, the base station may identify K-ary CBG(s) sequentially from the earliest time point among the plurality of the CBGs. In addition, according to an embodiment, the base station may identify K-ary CBG(s) sequentially in ascending order of the CBG index among the plurality of the CBGs. If Y % or more of the reception results for the K-ary CBG(s) are NACKs, the base station may determine that the reception result of the reference DL data channel 1540 is the NACK. For example, if K=1, Y=100% and the reception result of the terminal for a first CBG 1550 among the reception results for all the CBGs actually transmitted in the reference slot 1520 in the CBG-based reception result (i.e., the transmission result) received from the terminal is a NACK, the base station may determine that the reception result of the terminal for the reference DL data channel 1540 is the NACK. For another example, if K=2, Y=50% and a reception result of one or more CBG of the first CBG 1550 and the second CBG 1560 among the reception results for all the CBGs actually transmitted in the reference slot 1520 in the CBG-based reception result received from the terminal is the NACK, the base station may determine that the reception result of the reference DL data channel 1540 is the NACK.

According to various embodiments, at least one of the number K of the CBGs or the probability value Y which is the reference for determining the reference data channel, may be determined in various manners. In some embodiments, at least one parameter value of the K or Y value may be set in the terminal by the base station. For example, the base station may set the K or Y value in the terminal through a higher signal. In addition, in some embodiments, at least one of the K or Y value may be declared or predefined by the base station without separate configuration. At this time, presetting at least one parameter value of the K or Y value without separate additional configuration may be the same as, for example, predefining K=1 and Y=100%, or predefining to operate equally to K=1 and Y=100%. In this case, if the first CBG 1550 in the reception results for all the CBGs actually transmitted in the reference slot 1520 among the CBG-based reception result received from the terminal is the NACK, the base station may determine that the reception result of the reference DL data channel 1540 is the NACK.

The value K may be implicitly defined or changed according to a frequency axis resource allocation region of the reference DL data channel. For example, the base station may change the contention window using the reference slot, to correctly reflect the unlicensed band collision with other devices. With respect to the reference DL data channel for determining the contention window within the reference slot, the base station may need the reception result of the terminal for the entire region of the frequency band allocated the reference DL data channel. Hence, the base station may determine the reception result of the reference DL data channel 1540, using the reception result and the value Y of the CBG for obtaining the reception result of the entire frequency axis resources allocated to the reference DL data channel, for example, in FIG. 15, the CBGs 1550, 1560, and 1570 for obtaining the reception result of the terminal for the frequency band 1515 allocated the reference data channel, among the reference DL data channel reception result received from the terminal.

Method 2-3: if Y % of the reception results for CBG(s) of which transmission is initiated within X symbols as in Method 1-3 of the embodiment 1 among the reception results of all the CBGs of the reference DL data channel are NACKs, determine that the reception result of the reference DL data channel is a NACK.

Method 2-3 is described more specifically in FIG. 15.

The base station may receive from the terminal the CBG-based reception result of the reference DL data channel 1540. The base station may determine the reception result of the reference DL data channel 1540 using the reception result of the CBG(s) of which transmission is initiated within X symbols 1525 from the start of the reference DL data channel, among the CBG reception result of the terminal for the reference DL data channel 1540 actually transmitted to the terminal in the reference slot 1520. For example, the base station may determine the reception result of the reference DL data channel 1540 using the reception results of the CBGs 1550, 1560, and 1570 of which transmission is initiated within X symbols 1525, among the CBG-based reception result of the reference DL data channel 1540 received from the terminal. If Y=100% and all of the reception results for the CBGs 1550, 1560, and 1570 are NACKs, the base station may determine that the reception result of the reference DL data channel 1540 is a NACK. If the reception result of at least one CBG among the reception results of the CBGs 1550, 1560, and 1570 is an ACK, the base station may determine that the reception result of the reference DL data channel 1540 is an ACK. X and Y are only examples and are not limited to the above values.

According to various embodiments, at least one of the symbol position X or the probability value Y which is the reference for determining the reference data channel, may be determined in various manners. In some embodiments, at least one parameter value of the X or Y value may be set in the terminal by the base station. For example, the base station may set the X or Y value in the terminal through a higher signal. For example, the base station may set the X or Y value in the terminal through a higher signal. In addition, in some embodiments, at least one of the X or Y value may be declared or predefined by the base station without separate configuration. In this case, preconfiguration at least one or more parameter values of the X or Y value without separate additional configuration may be the same as, for example, predefining X=1 and Y=100%, or predefining to operate equally to X=1 and Y=100%.

In the embodiments described above, if determining the contention window, the reception result of the CBG used to determine the transmission result of the reference data channel indicates the reception result of the CBG actually transmitted by the base station in the reference slot. The base station may indicate the actually transmitted CBG among the CBGs through a CBGTI field of DCI for scheduling the DL data channel transmitted in the reference slot. The terminal may identify the actually retransmitted CBG among the CBGs through the CBGTI of DCI. Meanwhile, to maintain a HARQ-ACK codebook of the same size between the base station and the terminal, the terminal may also transmit to the base station the reception result of other CBGs than the CBG indicated as being actually transmitted. It is advantageous to change the contention window using only the reception result of the CBG transmitted in the reference slot. Hence, according to various embodiments, the base station may determine the transmission result of the reference data channel, based on the reception result of the actually transmitted CBG. For example, the CBGTI may include 6 bits, and the CBGTI may indicate 010010. The first CBG or the CBG having the smallest CBG index among the actually transmitted CBGs may indicate the temporally first CBG or the CBG having the smallest CBG index (e.g., a second CBG) among the CBGs (e.g., a second CBG and a fifth CBG) actually transmitted in the reference slot.

[Embodiment 2] Control Channel-Based Contention Window Adjustment

In an unlicensed band, the base station may determine a contention window used for a channel access procedure based on a reception result of a terminal for at least one channel of a DL data channel or a DL control channel transmitted a reference slot. That is, a method using the DL control channel is described, as the reference considered to determine the contention window of the base station proposed in various embodiments of the present disclosure. Hereafter, a method for determining (changing or maintaining) the contention window if one or more DL data channels are transmitted to the terminal in the reference slot is described.

A reference for adjusting the contention window of the base station determined through various embodiments of the present disclosure may be a channel of which transmission is initiated in an X-th symbol from a first symbol transmitted after the base station initiates the channel access. Referring to FIG. 14, the base station may determine (change or maintain) the contention window, by considering the DL control channels 1430 and 1450, the DL control channels 1430 and 1450 initiating the transmission within the X 1480 among the DL data channels 1440, 1445, 1455, 1460, and 1470, and the DL data channels 1440, 1455, and 1460 in the reference slot. In this case, for the sake of explanations, the DL control channels 1430 and 1450 may be referred to as reference DL control channels, in the contention window adjustment procedure. The example exemplifies the case where both of the reference DL data channel and the reference DL control channel are considered, but the present disclosure is not limited thereto. A method for determining the contention window by considering only the reference DL control channel, without considering the DL data channel, may also be understood as an embodiment. In some embodiments, the base station may determine the reference DL control channel in a similar manner to the reference data channel of the embodiment 1. For example, the base station may determine all the DL control channels included in the reference slot as the reference DL control channels. As another example, the base station may determine a first reference DL control channel of each terminal as the reference DL control channel. As yet another example, the base station may determine a DL control channel initiated within X symbols from the DL transmission time point as the reference DL control channel.

In general, the terminal does not transmit the reception result of the DL control channel, unlike the DL data channel. Hence, the base station needs to obtain the transmission result of only the DL control channel. The base station may obtain the transmission result of the DL control channel or information indicating it in the contention window adjustment procedure of the base station, and a method for determining the contention window using the obtained information may be required. For doing so, it is necessary to distinguish a DL control channel which may be determined as the reference DL control channel among the DL control channels. That is, among the DL control channels, a DL control channel for obtaining the reception result of the DL control channel, information for determining correct reception of the DL control channel, or information corresponding to the reception of the DL control channel may be used as the reference DL control channel. At this time, at least one or more DL control channels of the DL control channels may be reference DL control channels.

According to various embodiments, the base station may determine the DL control channel for obtaining the transmission result as the reference DL control channel. If the reference slot includes a plurality of DL control channels, the base station may determine the reference DL control channel in a similar manner to Methods 1-1, 1-2, and 1-3 of the embodiment 1. Hereafter, while examples of the DL control channel for obtaining the transmission result are described, such examples are exemplary and various embodiments of the present disclosure is not limited thereto. Besides the examples to be described, the DL control channel for obtaining the transmission result may be considered as the reference DL control channel for the contention window adjustment.

Case 1) A DL control channel for transmitting DCI indicating deactivation or release of a semi-persistent DL data channel reception configuration in which DCI CRC-scrambled with an SPS-RNTI or a configured scheduling (CS)-RNTI having been activated Case 1 is now described in more detail. The reception of the semi-persistent DL data channel may be set in the terminal. The terminal with the activated semi-persistent scheduling may receive the DCI CRC-scrambled with the SPS-RNTI or the CS-RNTI. The DCI may DCI indicating the deactivation or the release of the reception configuration of the preactivated semi-persistent DL data channel. The terminal may transmit HARQ-ACK information to the base station, to inform the base station of correct reception of the DCI, that is, to inform the base station that the terminal completes the release of the preactivated semi-persistent DL data channel reception configuration by the indication the base station. That is, as a result of receiving the DL control channel transmitted to the terminal in the reference slot, the base station may use a DL control channel for receiving the HARQ-ACK information from the terminal in Case 1, as the reference DL control channel.

At this time, even if the DL control channel transmits the DCI indicating the activation of the semi-persistent DL data channel reception configuration in which the DCI CRC-scrambled with the SPS-RNTI or the CS-RNTI is set, the base station may use the DL control channel including the DCI as the reference DL control channel. The base station may regard the reception result of the terminal for the first DL data channel of the activated semi-persistent downlink data channel, that is, HARQ-ACK information as a response signal of the terminal for the DCI reception. The base station may obtain a transmission result for the DL data channel. The base station may change the contention window using the transmission result.

Case 2) A DL control channel in which the DCI CRC-scrambled with the SPS-RNTI or the CS-RNTI transmits the DCI indicating the activation, the deactivation or the release of the semi-persistent UL data channel transmission configuration Case 2 is described in more detail as follows. The terminal configured with the semi-persistent UL data channel transmission may activate the configured semi-persistent UL data channel transmission configuration through the DCI CRC-scrambled with the SPS-RNTI or the CS-RNTI. Similarly, the terminal may deactivate or release the preactivated semi-persistent UL data channel transmission configuration through the DCI CRC-scrambled with the SPS-RNTI or the CS-RNTI. In this case, whether the DCI is the DCI indicating the activation of the semi-persistent UL data channel transmission configuration or the DCI indicating the deactivation or the release may be indicated by specific field information of the DCI. For example, if a new data indicator (NDI) field is 0 and an HARQ process number field and a redundancy version field are both set to 0, the DCI is the DCI indicating the activation of the semi-persistent UL data channel transmission configuration. If the NDI field of the DCI is 0, the HARQ process number field and redundancy version field values are all set to 0, and modulation and coding scheme field and frequency resource allocation field values are all set to 1, the terminal may determine that the DCI is the DCI indicating the deactivation or the release of the semi-persistent UL data channel transmission configuration. The terminal receiving the DCI indicating the activation or the release of the semi-persistent UL data channel transmission configuration may transmit response information for the DCI reception to inform the base station that the DCI is correctly received. Specifically, to inform the base station that the terminal has activated the semi-persistent UL data channel transmission configuration by the indication of the base station or has completed the release of the preactivated semi-persistent UL data channel transmission configuration, the terminal may transmit the response information for the DCI reception to the base station similarly to Case 1. At this time, the terminal may transmit the response information to the base station through MAC CE information. More specifically, the terminal may transmit the response information for the DCI reception to the base station, by transmitting 0 bit stream in every region for an LCD (e.g., index 55) corresponding to the configured grant confirmation or the SPS confirmation. The response information may include a reception result of the terminal for the DCI, that is, a transmission result of the DL control channel of the base station. The base station may determine the DL control channel for receiving from the terminal the reception result of the DL control channel transmitted to the terminal in the reference slot (e.g., in Case 2, MAC CE confirmation information or the UL data channel transmitting the MAC CE confirmation information) as a reference downlink control channel.

Case 3) A DL control channel transmitting DCI (i.e., UL grant) for configuring UL data channel transmission Case 3 is explained in more detail as follows. The terminal receiving the DCI for setting the UL data channel transmission (e.g., if the NDI field of the DCI CRC-scrambled with the C-RNTI or the DCI CRC-scrambled with the SPS-RNTI or the CS-RNTI is 1) may transmit the UL data channel in the time-frequency resource region configured in the DCI. If the terminal does not correctly receive the DCI, the terminal may not transmit the uplink data channel. Thus, the base station may consider the UL data channel transmitted by the terminal as response information of the terminal for the DCI reception. The terminal may use whether the UL data channel is received to determine the contention window.

That is, as a result of receiving the DL control channel transmitted to the terminal in the reference slot, that is, the base station may use the DL control channel for receiving the configured UL data channel from the terminal as the reference DL control channel. The base station may use the DL control channel including the UL grant as the reference DL control channel.

The terminal may perform the channel access procedure for the unlicensed band before the uplink data channel transmission initiation. If the base station does not receive the UL data channel configured by the base station in the terminal in performing the channel access procedure for the unlicensed band before the UL data channel transmission initiation, this may result from at least one of the terminal's channel access procedure failure or the terminal's DCI reception failure. However, the base station may not identify whether the failure of the UL data channel is failure due to channel occupancy by other node (i.e., a failure due to the channel access procedure) or DCI decoding failure. If considering only whether the terminal receives the UL data channel, the transmission result for the DL control channel may include not only collision with other devices in the reference slot of the base station but also the channel access procedure result of the terminal.

To minimize the above-described problem, the base station according to various embodiments may determine the reference DL control channel more restrictively. In various embodiments, if the UL data channel configured through the DL control channel transmitted to the terminal in the reference slot may transmit the UL data channel without the LBT procedure of the terminal, the base station may use the DL control channel as the reference DL control channel. For example, if a specific field of the DCI (i.e., UL grant) for setting the UL data channel transmission, for example, a channel access scheme indicator indicates that UL data transmission is possible without performing the LBT procedure (e.g., indicate the Type 3 channel access procedure), the terminal may transmit the UL data channel without the LBT. Herein, transmitting the UL data channel without the LBT procedure may indicate transmitting the UL data channel, without performing channel sensing conducted in advance in the unlicensed band access. For another example, if the terminal initiates and ends the configured UL data channel transmission within a COT acquired by the base station, and an interval between the UL data channel transmission and the DL signal transmission of a previous base station is within 16 μs, the terminal may transmit an UL signal without a separate LBT procedure for the UL data channel transmission.

If the terminal may transmit the UL data channel without the LBT procedure, if the base station does not receive the UL data channel configured to the terminal, the base station may determine that the terminal fails to receive the DCI and does not transmit the UL data channel. Hence, if the terminal may transmit the UL data channel without performing the LBT procedure in the channel access procedure, the base station may determine a DL control channel related to the UL data channel as the reference DL control channel.

In various embodiments, even if the UL data channel configured through the DL control channel transmitted to the terminal in the reference slot is transmitted after the channel access procedure of the terminal (or if using the Type 2 channel access procedure), the base station may use the DL control channel as the reference DL control channel. At this time, since not only the collision with other devices in the reference slot of the base station but also the channel access procedure result of the terminal may be reflected in the contention window change, to perform channel access procedure and transmit the UL data channel (or, regardless of whether the terminal needs to perform the channel access procedure), the base station may change the contention window by considering the DL control channel. According to an embodiment, the base station may determine a DL control channel related to a UL data channel after performing the channel access procedure (e.g., the Type 2 channel access procedure) corresponding to a shorter channel sensing period as the reference DL control channel.

According to various embodiments, the base station may determine the contention window by considering the various cases described above. For example, the base station may increase (or maintain (e.g., already the maximum value)) the contention window for each case, in at least one case of a case in which the base station does not receive response signals of P1% among response signals for one or more DL control channels transmitted to one or more terminals transmitted by the base station in the reference slot, a case in which response signals of P2% are received among the response signals but are NACKs, or a case in which response signals of P3% are not received among the response signals or responses are received but are NACKs. At this time, P1, P2, and P3 may be identical or different, and may have more subdivided values according to the various embodiments and cases. At least one of P1, P2, or P3 is a value which is predefined between the base station and the terminal or is set by the base station to the terminal through a higher signal, and the base station may declare and use it without additional configuration or notification to the terminal.

To describe Case3 as a representative example, the base station may regard whether the UL data channel configured or scheduled through the DCI transmitted through the DL control channel transmitted to the terminal in the reference slot is received as the response signal of the terminal for the DL control channel, and use it as the reference DL control channel. That is, if the base station fails to receive the UL data channel transmission of P1%, in the UL data channel transmission configured through the DCI transmitted through the DL control channel to one or more terminals in the reference slot, the base station may increase the contention window. For example, if the terminal may transmit the UL data channel without the LBT, if the base station receives even at least one UL data of the UL data channel transmission configured through the DCI transmitted through the DL control channel to one or more terminals in the reference slot, the base station may initialize the contention window. This is equivalent to P1=100%. In addition, for example, if the terminal may transmit the UL data channel by performing the Type 2 channel access procedure, if the base station receives the UL data channel over P1% in the UL data channel transmission configured through the DCI transmitted through the DL control channel to one or more terminals in the reference slot, the base station may initialize the contention window. If the base station does not receive the UL data channel over P1%, the base station may increase the contention window.

In addition, the base station may determine whether to change the contention window by considering each case independently, or determine whether to change the contention window by considering at least two cases of the cases together. For example, it may determine whether to change the contention window based on C1%, C2%, and C3% of the response signals with respect to Case 1, Case 2, and Case 3 respectively, or determine whether to change the contention window based on C % of the entire response signals, by considering Case 1, Case 2, and Case 3 together. At this time, C, C1, C2, and C3 may be identical or different, and may have more subdivided values according to the various embodiments and the cases. At least one of C, C1, C2, or C3 is a value predefined between the base station and the terminal or configured by the base station to the terminal through a higher signal, and the base station may declare and use it without separately configuration or notification to the terminal.

According to various embodiments, the base station may determine the contention window, by considering both of the reference DL control channel and the reference DL data channel. The base station may determine according to at least one or more methods of the following methods.

Method 1: the base station increases the contention interval if satisfying at least one reference of the following references.

Reference 1-1: if response signals of C % are not received or are received but are NACKs among response signals of the terminal for the reference DL control channel Reference 2-1: if response signals of D % among the response signals of the terminal for the reference DL data channel are NACKs or may be regarded as NACKs If all of the above references are not satisfied, the base station may change the contention window to an initial value. At this time, increasing the contention window even if only one reference of the references is satisfied by the base station is only an example and is not limited thereto. For example, the base station may increase the contention window only if all of the above references are satisfied.

Method 2: the base station increases the contention window if the reference 3 is satisfied among the following references.

Reference 1-2: a percentage (C2%) that a response signal is not received or is received but is a NACK among the terminal's response signals for the reference DL control channel Reference 2-2: a percentage (D2%) that a response signal is a NACK or is regarded as a NACK among the terminal's response signals for the reference DL control channel Reference 3: if a minimum MIN(C2, D2) or maximum value MAX(C2, D2) of C2% and D2% of the reference 1-2 and the reference 2-2 is greater than K %

If the reference 3 is not satisfied, the base station may change the contention window to the initial value.

Method 3: the base station increases the contention window if the reference 3 of the following references is satisfied.

Reference 1-3: a number C3 that a response signal is not received or is received but is a NACK among the terminal's response signals for the reference DL control channel Reference 2-3: a number D3 of response signals which are NACKs or are regarded as NACKs among the terminal's response signals for the reference DL control channel Reference 3: if a ratio of the reference 1 and the Reference 2 among the entire terminal response signals of the reference 1-3 and the reference 2-3, (C3+D3)/the number of total response signals is greater than K %

If the reference 3 is not satisfied, the base station may change the contention window to the initial value. Meanwhile, in some embodiments, if the response signal of the terminal for the reference DL control channel is HARQ-ACK information, the base station may determine whether the reference 2-1, 2-2, or 2-3 is satisfied, based on the response signal.

Various embodiments of the present disclosure propose a method for determining a contention window for performing a channel access procedure of a base station, in an unlicensed band of a wireless communication system. In various embodiments of the present disclosure, by using DL transmission signals of various types in the contention window adjustment procedure, the base station may perform the channel access procedure more efficiently, by considering collisions with other nodes to occupy the unlicensed band.

To adjust the size of the contention window, that is, the contention window size, the present disclosure defines the reference slot which is the period considering the HARQ-ACK value. According to various embodiments, this reference slot is a slot including DL transmission which carries at least one of a DL control channel or a DL data channel, and may be a unit for constructing a radio frame. Herein, the slot may be a concept distinguished from a slot period (e.g., 9 μs) for determining channel occupancy by other node such as CCA of the LBT.

In the present disclosure, to determine whether a specific condition (or a reference) is fulfilled, expressions such as equal to or greater than or equal to or less than are used but is merely an expression by way of example and does not exclude expressions of greater than or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

In addition, phe program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, the embodiments of the present disclosure disclosed in the specification and the drawings suggest a specific example to easily explain the technical contents of the present disclosure and to help understanding of the present disclosure, and are not intended to limit the scope of the present disclosure. That is, it is apparent to those skilled in the technical field of the present disclosure that other modifications based on the technical spirit of the present disclosure may be made. In addition, the above respective embodiments may be combined and operated. For example, parts of the methods suggested in the present disclosure may be combined to operate a base station and a terminal. Further, although the embodiments have been suggested based on 5G and NR systems, other modifications based on the technical spirit of the embodiments may be made in other systems such as LTE, LTE-A, and LTE-A-Pro systems.

The invention claimed is:

1. A method performed by a base station, in a wireless communication system, comprising:
   performing a channel access procedure for a channel occupancy time (COT) in an unlicensed band;
   obtaining a hybrid automatic repeat request-acknowledge (HARQ-ACK) feedback for a reference duration based on the channel access procedure, wherein the HARQ-ACK feedback comprises a transmission result for at least one code block group (CBG) transmitted on a physical downlink shared channel (PDSCH) or at least one transmission result for at least one transport block (TB) transmitted on at least one PDSCH;
   in case that a ratio of ACKs for the at least one CBG is greater than a threshold based on the HARQ-ACK feedback, identifying a size of a contention window for a next channel access procedure as a minimum size; and
   in case that the at least one transmission result for the TB in the reference duration corresponds to at least one ACK, identifying the size of the contention window as the minimum size,
   wherein the reference duration comprises a first slot where the at least one PDSCH is transmitted after the COT is started, the COT being initiated by the base station.

2. The method of claim 1, wherein a value of the threshold is predefined, and
   wherein the size of the contention window is determined as the minimum size according to a channel access priority.

3. The method of claim 1, further comprising:
   transmitting, to a user equipment (UE), downlink control information including a code block group transmission indication (CBGTI) field, and
   wherein the CBGTI field indicates the at least one CBG for the HARQ-ACK feedback.

4. The method of claim 1, wherein the reference duration includes at least one symbol of a slot, and
   wherein at least one remaining symbol of the slot is not in the COT.

5. A method performed by a user equipment (UE), in a wireless communication system, comprising:
   performing a channel access procedure for a channel occupancy time (COT) in an unlicensed band;
   obtaining a hybrid automatic repeat request-acknowledge (HARQ-ACK) feedback for a reference duration based on the channel access procedure, wherein the HARQ-ACK feedback comprises a transmission result for at least one code block group (CBG) transmitted on a physical uplink shared channel (PUSCH) or at least one transmission result for at least one transport block (TB) transmitted on at least one PUSCH;
   in case that a ratio of ACKs for the at least one CBG is greater than a threshold based on the HARQ-ACK feedback, identifying a size of a contention window for a next channel access procedure as a minimum size; and
   in case that the at least one transmission result for the TB in the reference duration corresponds to at least one ACK, identifying the size of the contention window as the minimum size,
   wherein the reference duration comprises a first slot where the at least one PUSCH is transmitted after the COT is started, the COT being initiated by a base station.

6. The method of claim 5, wherein a value of the threshold is predefined, and
   wherein the size of the contention window is determined as the minimum size according to a channel access priority.

7. The method of claim 5, further comprising:
   receiving, from a base station, downlink control information including a code block group transmission indication (CBGTI) field, and
   wherein the CBGTI field is associated with the HARQ-ACK feedback.

8. The method of claim 5, wherein the reference duration includes at least one symbol of a slot, and
   wherein at least one remaining symbol of the slot is not in the COT.

9. A base station, in a wireless communication system, comprising:
   at least one transceiver; and
   at least one processor,
   wherein the at least one processor is configured to:
      perform a channel access procedure for a channel occupancy time (COT) in an unlicensed band;
      obtain a hybrid automatic repeat request-acknowledge (HARQ-ACK) feedback for a reference duration based on the channel access procedure, wherein the HARQ-ACK feedback comprises a transmission result for at least one code block group (CBG) transmitted on a physical downlink shared channel (PDSCH) or at least one transmission result for at least one transport block (TB) transmitted on at least one PDSCH;
      in case that a ratio of ACKs for the at least one CBG is greater than a threshold based on the HARQ-ACK feedback, identify a size of a contention window for a next channel access procedure as a minimum size; and
      in case that the at least one transmission result for the TB in the reference duration corresponds to at least one ACK, identify the size of the contention window as the minimum size,
      wherein the reference duration comprises a first slot where the at least one PDSCH is transmitted after the COT is started, the COT being initiated by the base station.

10. The base station of claim 9, wherein a value of the threshold is predefined, and
wherein the size of the contention window is determined as the minimum size according to a channel access priority.

11. The base station of claim 9, wherein the at least one processor is further configured to:
transmit, to a user equipment (UE), downlink control information including a code block group transmission indication (CBGTI) field, and
wherein the CBGTI field indicates the at least one CBG for the HARQ-ACK feedback.

12. The base station of claim 9, wherein the reference duration includes at least one symbol of a slot, and
wherein at least one remaining symbol of the slot is not in the COT.

13. A user equipment (UE), in a wireless communication system, comprising:
at least one transceiver; and
at least one processor,
wherein the at least one processor is configured to:
perform a channel access procedure for a channel occupancy time (COT) in an unlicensed band;
obtain a hybrid automatic repeat request-acknowledge (HARQ-ACK) feedback for a reference duration based on the channel access procedure, wherein the HARQ-ACK feedback comprises a transmission result for at least one code block group (CBG) transmitted on a physical uplink shared channel (PUSCH) or at least one transmission result for at least one transport block (TB) transmitted on at least one PUSCH;
in case that a ratio of ACKs for the at least one CBG is greater than a threshold based on the HARQ-ACK feedback, identify a size of a contention window for a next channel access procedure as a minimum size; and
in case that the at least one transmission result for the TB in the reference duration corresponds to at least one ACK, identify the size of the contention window as the minimum size,
wherein the reference duration comprises a first slot where at least one PUSCH is transmitted after the COT is started, the COT being initiated by a base station.

14. The UE of claim 13, wherein a value of the threshold is predefined, and
wherein the size of the contention window is determined as the minimum size according to a channel access priority.

15. The UE of claim 13, wherein the at least one processor is further configured to:
receive, from a base station, downlink control information including a code block group transmission indication (CBGTI) field, and
wherein the CBGTI field is associated with the HARQ-ACK feedback.

16. The UE of claim 13, wherein the reference duration includes at least one symbol of a slot, and
wherein at least one remaining symbol of the slot is not in the COT.

17. The UE of claim 13, wherein the at least one processor is further configured to:
in case that at least one HARQ-ACK feedback for at least PUSCH in the reference duration corresponds to an ACK, identify the size of the contention window as the minimum size.

* * * * *

UNITED STATES PATENT AND TRADEMARK OFFICE
CERTIFICATE OF CORRECTION

| | | |
|---|---|---|
| PATENT NO. | : 12,120,736 B2 | Page 1 of 1 |
| APPLICATION NO. | : 17/309884 | |
| DATED | : October 15, 2024 | |
| INVENTOR(S) | : Oh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
Twenty-fourth Day of June, 2025

Coke Morgan Stewart
*Acting Director of the United States Patent and Trademark Office*